(12) United States Patent
Oyama et al.

(10) Patent No.: US 9,400,547 B2
(45) Date of Patent: Jul. 26, 2016

(54) PROCESSING DEVICE AND METHOD THEREOF

(71) Applicant: KABUSHIKI KAISHA TOSHIBA, Tokyo (JP)

(72) Inventors: Yuichiro Oyama, Tokyo (JP); Takeshi Ishihara, Yokohama (JP); Hiroshi Nishimoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 14/024,470

(22) Filed: Sep. 11, 2013

(65) Prior Publication Data

US 2014/0075228 A1    Mar. 13, 2014

(30) Foreign Application Priority Data

Sep. 12, 2012   (JP) .................................. 2012-200848
Sep. 5, 2013    (JP) .................................. 2013-184421

(51) Int. Cl.
*G06F 15/16*      (2006.01)
*G06F 1/32*       (2006.01)

(52) U.S. Cl.
CPC .............. *G06F 1/3296* (2013.01); *G06F 1/329* (2013.01); *Y02B 60/144* (2013.01)

(58) Field of Classification Search
CPC ...... G06F 1/329; G06F 1/3296; Y02B 60/144
See application file for complete search history.

(56) References Cited

U.S. PATENT DOCUMENTS

| 2010/0033424 | A1* | 2/2010 | Kabasawa | G01C 17/28 345/156 |
| 2010/0083260 | A1* | 4/2010 | Wang | G06F 1/3203 718/102 |
| 2010/0257394 | A1* | 10/2010 | Koga | G06F 1/3203 713/324 |
| 2011/0103281 | A1* | 5/2011 | Son | H04W 76/048 370/311 |
| 2013/0080499 | A1* | 3/2013 | Oyama | H04L 67/1097 709/201 |
| 2013/0171995 | A1* | 7/2013 | Fujishiro | H04W 28/08 455/441 |

FOREIGN PATENT DOCUMENTS

JP    11-219313    8/1999
JP    2005-266929  9/2005

OTHER PUBLICATIONS

Oyama et al., U.S. Appl. No. 13/537,477, filed Jun. 29, 2012.

* cited by examiner

*Primary Examiner* — Jonathan Bui
(74) *Attorney, Agent, or Firm* — Nixon & Vanderhye, P.C.

(57) ABSTRACT

According to some embodiments, there is provided a communication device including: a processing unit and a notifying unit. The processing unit receives an acquisition request of first information from a requester and determines based on a predetermined condition whether or not the first information needs to be acquired from an acquisition destination of the first information. The notifying unit notifies a first response to the requester when the processing unit determines that the first information needs to be acquired, the first response containing an instruction of transitioning to a low power consumption status.

15 Claims, 26 Drawing Sheets

(A)
GET / HTTP/1.1
Host: www.example.com
Connection: keep-alive
...

(B)
HTTP/1.1 200 OK
...《OTHER HEADERS》

<DATA>

(C)
HTTP/1.1 404 Not Found
...《OTHER HEADERS》

<INFORMATION INDICATING ERROR>

(D)
GET http://www.example.com/ HTTP/1.1
Host: www.example.com
Proxy-Connection: keep-alive
...

(E)
HTTP/1.1 103 Fetching
Sleep-Time: $T_1$
...《OTHER HEADERS》

FIG. 3

```
HTTP/1.1 303 See Other
Location: URL COINCIDENT WITH NEWLY GENERATED KEY
Sleep-Time: T₁
⋯《OTHER HEADERS》
```

FIG. 7

EXTRACTION TARGET FROM HTML FILE (EX.)

| TYPE OF FILE | EXAMPLE OF TAGS |
|---|---|
| SCRIPT FILE | \<script src= "URL" \> |
| STYLE SHEET | \<link rel= "STYLESHEET" href= "URL" \> |
| IMAGE FILE | \<img src= "URL" \> <br> \<body background= "URL" \> |
| MOVING PICTURE FILE | \<video poster= "POSTER_URL" \> <br> \<source src= "VIDEO_URL" \> <br> \</video\> |

EXTRACTION TARGET FROM STYLE SHEET (EX.)

| STAYLE SHEET | @import "URL" <br> @import url( "URL" ) |
|---|---|
| IMAGE FILE | url( "URL" ) |

FIG. 10

```
HTTP/1.1 103 Fetching
Total-Length: S
...《OTHER HEADERS》

HTTP/1.1 303 See Other
Location: URL COINCIDENT WITH NEWLY GENERATED KEY
Total-Length: S
...《OTHER HEADERS》
```

FIG. 12

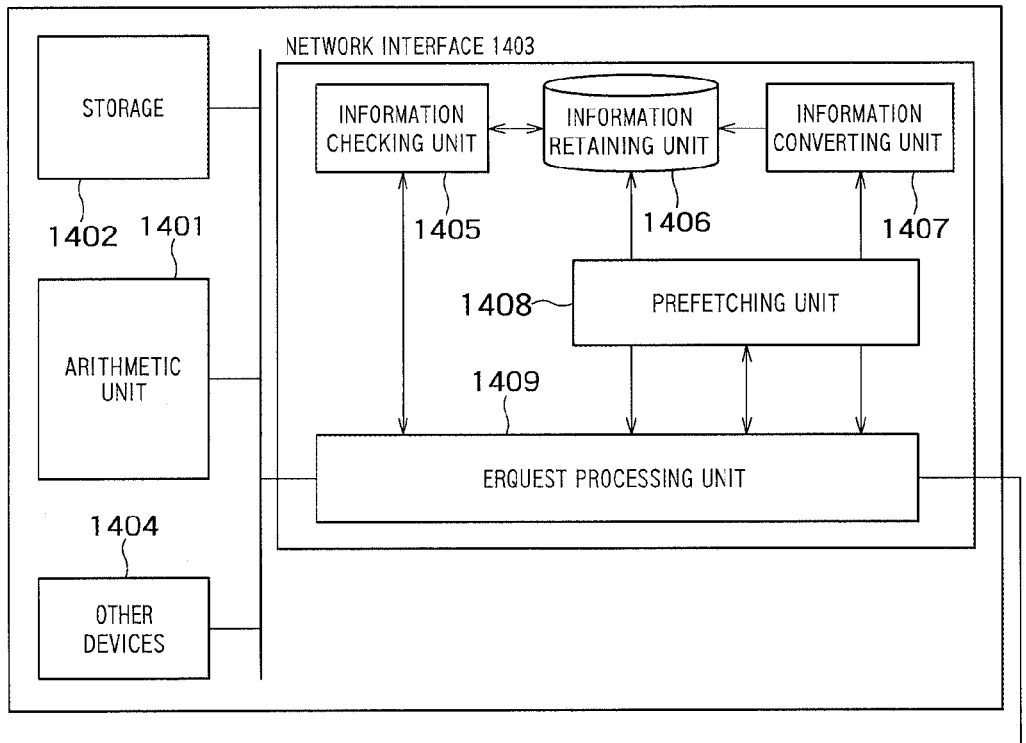
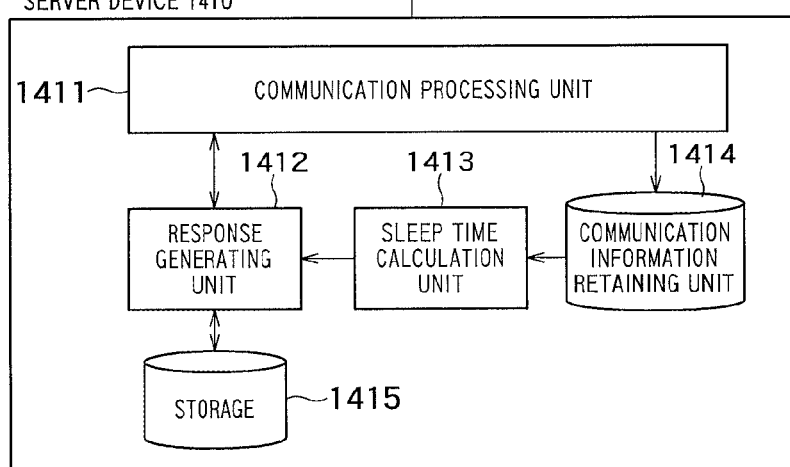
FIG. 14

| REQUESTED INFORMATION | TOTAL SIZE |
|---|---|
| A.html | 300KB — S1601 |
| B.html | 756KB — S1602 |
| ... | ... |

FIG. 16

PROCESSING DEVICE AND METHOD THEREOF

CROSS REFERENCE TO RELATED APPLICATIONS

This application is based upon and claims the benefit of priority from the prior Japanese Patent Application No. 2012-200848, filed on Sep. 12, 2012 and No. 2013-184421, filed on Sep. 5, 2013, the entire contents of which are incorporated herein by reference.

FIELD

Embodiments described herein relate to a communication device, an information communication system and a method thereof.

BACKGROUND

There is a wide spread of a cache proxy technology of temporarily accumulating (caching) various categories of information opened to the public on a network and making a proxy response to a request given from a terminal device. For example, on such an occasion that a Web browser running on the terminal device acquires information from a Web server, the terminal device makes an attempt to acquire the information from a cache proxy by accessing at first the cache proxy. If the cache proxy retains the information, the information can be acquired sooner than by directly acquiring the information from the Web server. Whereas if the cache proxy does not retain the information, the cache proxy acquires the information by accessing the Web server in place of the terminal device. The cache proxy accumulates the acquired information and thereafter sends the information back to the terminal device. This type of cache proxy for the Web page provides a function of promptly providing the information in response to the same information acquisition requests given from a plurality of terminal devices.

Moreover, such a technology is known as to collect items of information accumulated by the cache proxy in advance of the request given from the terminal device. There increase instances in which the use of this technology enables the information to be promptly acquired, and it is feasible to improve an effect of the cache proxy.

On the contrary, even the use of the technology described above does not enable the cache proxy to accumulate all the information beforehand. When the cache proxy does not retain the information, there is occurrence of waiting time till the terminal device acquires the information.

BRIEF DESCRIPTION OF THE DRAWINGS

FIG. 3 is a diagram illustrating an example of a request received by the communication device and a response thereof;

FIG. 7 is a diagram showing an example of adding sleep time to the redirect response;

FIG. 10 is a diagram illustrating one example of tags specifying an extraction target element;

FIG. 12 is a diagram illustrating an example of a response generated by a response generating unit;

FIG. 14 is a functional block diagram of a terminal device and a server device in a sixth embodiment;

FIG. 16 is a diagram illustrating an example of information retained in a communication information retaining unit;

DETAILED DESCRIPTION

Figure 1:
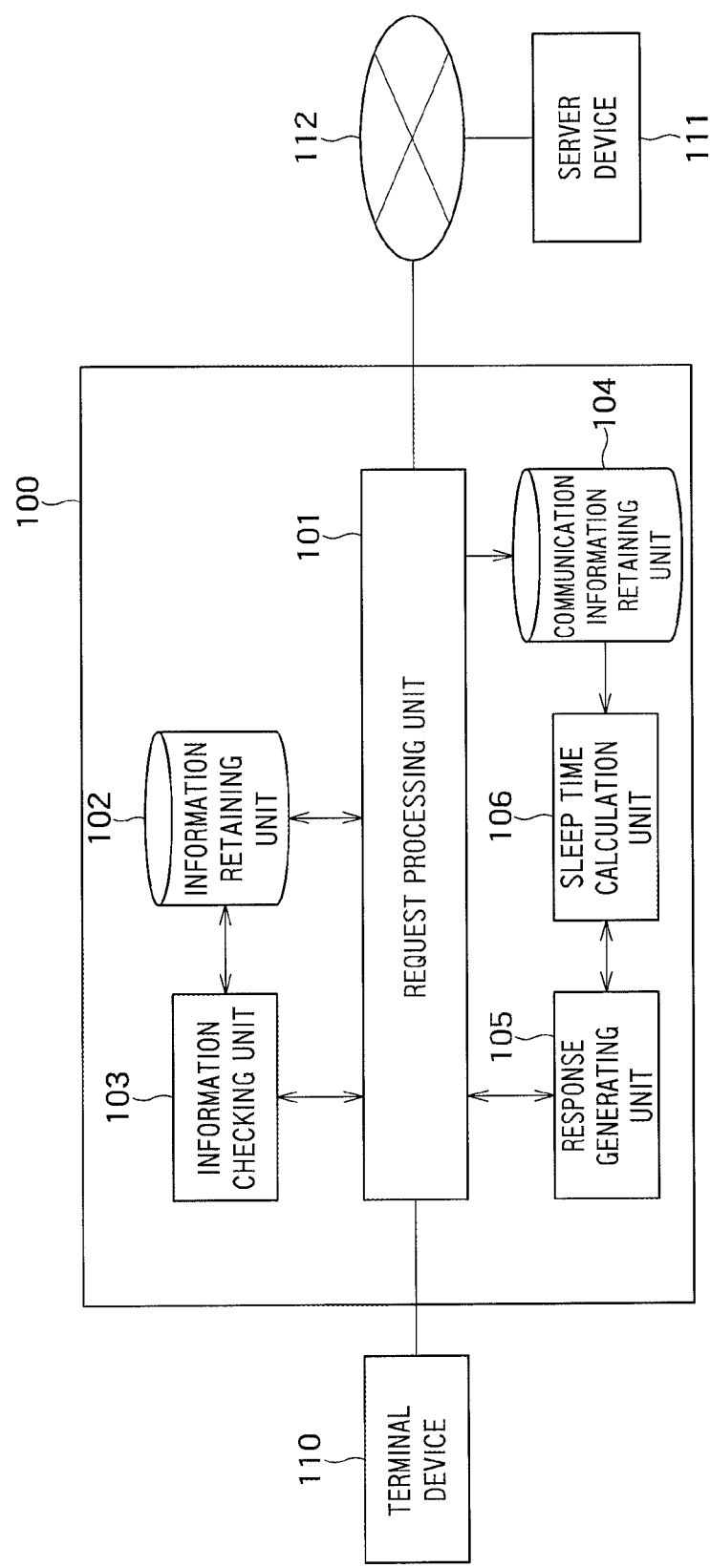
FIG. 1 is a functional block diagram of a communication device according to a first embodiment.

According to some embodiments, there is provided a communication device including: a processing unit and a notifying unit.

The processing unit receives an acquisition request of first information from a requester and determines based on a predetermined condition whether or not the first information needs to be acquired from an acquisition destination of the first information.

The notifying unit notifies a first response to the requester when the processing unit determines that the first information needs to be acquired, the first response containing an instruction of transitioning to a low power consumption status.

Hereinafter, embodiments will be described with reference to the drawings. Note that the same portions are marked with the same numerals and symbols in the drawings throughout, and redundant explanations are omitted.

First Embodiment

Description of Components

FIG. 1 shows a configuration of a communication device 100 according to a first embodiment. It should be noted that the components of the communication device 100 are described in the way of being limited to the components needed for carrying out the present invention, and the communication device 100 may also be mounted with additional other components. Further, FIG. 1 includes a representative example of a network architecture using the present device.

The communication device 100 is installed between a terminal device 110 that issues an information acquisition request and a server device 111. In FIG. 1, though the communication device 100 and the server device 111 are connected via a network 112, the architecture is not necessarily limited to this topology. The terminal device 110 is one example of a requestor for information and the server device 111 is one example of an acquisition destination of the information.

A configuration of the communication device 100 is given as follows.

A request processing unit 101 incorporates a reception function of receiving an information acquisition request from the terminal device 110, a processing function of determining based on a predetermined condition whether there is a necessity for acquiring the requested information from the server device or not, an acquiring function of acquiring, if required for the acquisition, the information from the server device 111, a notifying function of sending back a sleep response that will be described later on if required for the acquisition, a communication processing function needed on the occasion of acquiring the information from the server device 111, and an output function of sending back the acquired information as a response to the terminal device 110. The condition for determining whether there is the necessity for acquiring the requested information from the server device or not is given by way of one example such as determining whether or not the requested information has previously been acquired, i.e., whether or not the requested information is accumulated in an information retaining unit 102 that will be described later on. It is determined that there exists the necessity for the acquisition if not accumulated and that there exists no necessity for the acquisition whereas if accumulated. The request processing unit 101 incorporates an output function of sending back the previously-accumulated information as a response to the terminal device 110 if determining that the information is accumulated (if determining that there is no necessity for acquiring the information). Further, another condition is exemplified by determining whether or not, though the information has previously been acquired, the period of validity of this previously-acquired information expires or whether or not a fixed period of time elapses since the information has been acquired. If the period of validity expires or the fixed period of time elapses, such a possibility is assumed to exist that the information will have been updated, and hence it is determined that there is the necessity for acquiring the information. Whereas if not, it is determined that there is no necessity for the acquisition. Moreover, still another condition is also exemplified by determining whether or not the requested information is allowed to be transmitted to the terminal device 110. For example, security standards are set on a per terminal device basis or on a per user basis, and it is determined from the information acquiring request (URI etc.) whether the requested information satisfies the security standards or not. If not satisfied, the requested information has no necessity for being transmitted to the user, and notification purporting that the requested information cannot be transmitted to the terminal device may also be returned. In this case, even when the requested information has not previously been accumulated, it may be determined that there is no necessity for acquiring the information from the server device, or alternatively the information may be acquired and accumulated beforehand by assuming a high possibility of receiving the request from another user. Each of these exemplifications is nothing but one example, and the present embodiment is not limited to these exemplifications. The following discussion will assume a case of determining, based on whether the requested information has previously been acquired by the information retaining unit 102, whether this information needs to be acquired or not. The request processing unit 101 is realized by, e.g., software running on the processor and by a dedicated circuit which implements one or more functions.

An information retaining unit 102 accumulates the information acquired by the request processing unit 101 from the server device 111. The information retaining unit 102 is realized by, e.g., a hard disk and/or an SSD (Solid State Drive).

An information checking unit 103 checks whether the requested information is accumulated in the information retaining unit 102 or not and whether the accumulated information is valid information or not. Herein, the phrase "the information being valid" implies a state of not expiring valid time set in respective items of information beforehand by the server device 111, or a state of not expiring the valid time set by the present device 100. Note that this function does not necessarily need incorporating but may be managed by a method other than using the valid time. For instance, the information with the elapse of the fixed period of time since the accumulation has been started may be determined invalid. The information checking unit 103 is realized by, e.g., the processor and/or the dedicated circuit and may also be, on this occasion, realized together with the request processing unit 101.

A communication information retaining unit 104 saves information about the network 112 between the communication device 100 and the server device 111 and information about the communications. For example, the communication information retaining unit 104 is realized by a storage medium such as the hard disk and/or the SSD.

A sleep time calculation unit 106 calculates specifying information for specifying a period of time (sleep time) for which the terminal device 110 may transition to an arbitrary status (this status will hereinafter be termed a sleep status) where power consumption is lower than when in the normal operation by use of the information saved on the communication information retaining unit 104. As the specifying information, e.g., the sleep time itself may be calculated, and, as will be described later on, a size of the information transmitted to the terminal device 110 may also be used (in this case, the terminal 110 receiving the information size determines itself the sleep time). Herein, the discussion proceeds on the assumption that the sleep time is calculated. The sleep time calculation unit 106 is realized by, e.g., the processor and the dedicated circuit and may also be realized together with other components such as the request processing unit 101 and the information checking unit 103. Note that the "sleep status" has a characteristic that the power consumption is lower than usual in the first embodiment, and specific expedients are considered such as stopping the power supply to a part of the components within the terminal device 110 or a further part of circuits within some of the components, decreasing an operating frequency and disabling the information from being received from the network.

A response generating unit 105 generates, based on an instruction given from the request processing unit 101, a response sent back to the terminal device 110. This response contains the sleep time generated (calculated) by the sleep time calculation unit 106. The response generating unit 105 is realized by, e.g., the processor and/or the dedicated circuit and may also be realized together with other components such as the request processing unit 101 and the information checking unit 103. The response may contain identifying information of the sleep time without containing the sleep time itself. In this case, the terminal device 110 shall retain a lookup table or functions enabling the sleep time to be derived from the identifying information. This type of identifying information corresponds to one example of the specifying information for specifying the time for which to get the terminal device 110 transitioning to the sleep status.

First Embodiment

Description of Operation Sequence

Figure 2:
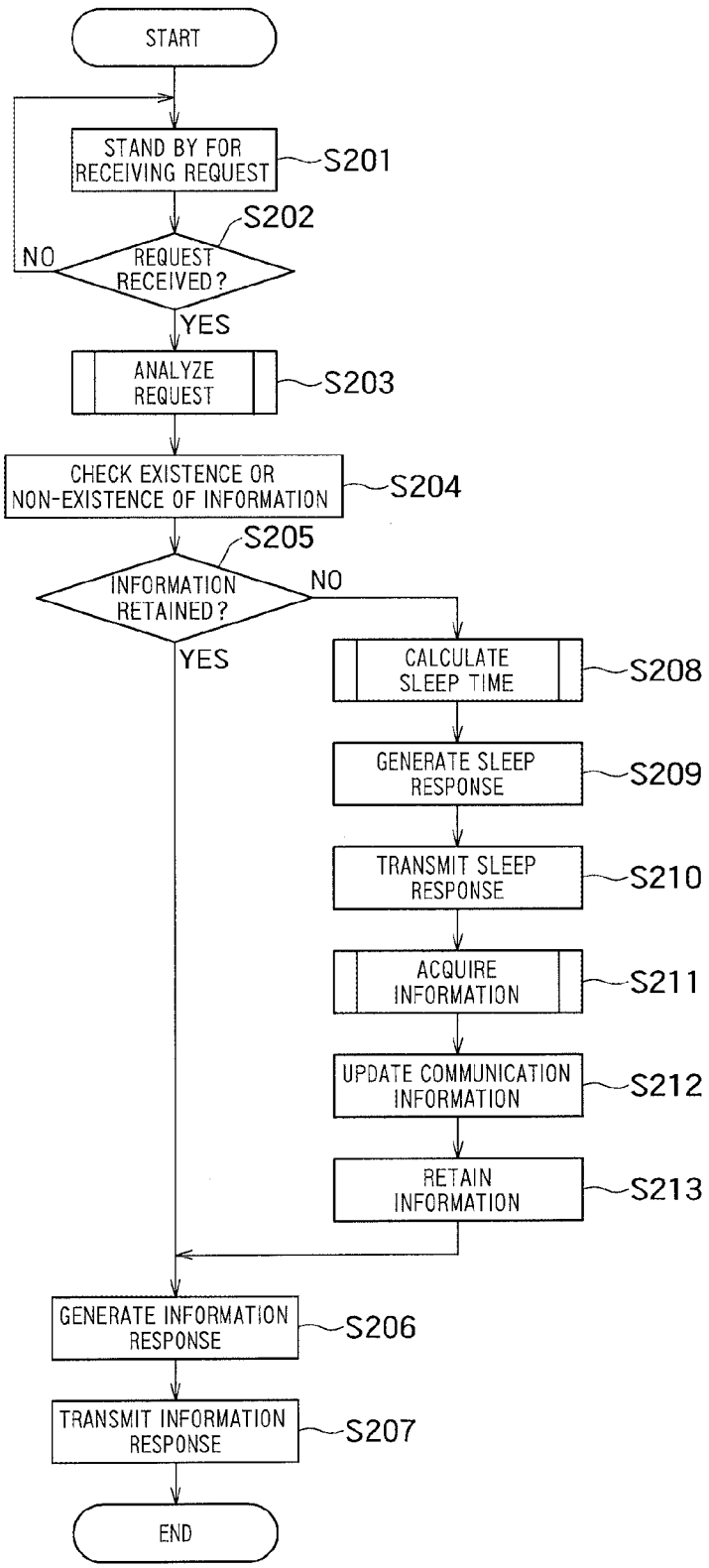
FIG. 2 is a flowchart of an operation of the communication device in FIG. 1.

FIG. 2 illustrates a flowchart of an operation of the communication device 100. Normally, the communication device 100 stands by for the information acquisition request from the terminal device 110 (S201). The communication device 100 (request processing unit 101) checks a request reception state at predetermined timing and, if not receiving the request, the communication device 100 uninterruptedly awaits the request (S202—NO). Whereas if receiving the request (S202—YES), the communication device 100 (request processing unit 101) analyzes the received request (S203). A series of processes described so far are all executed by the request processing unit 101.

The request processing unit 101 notifies an analyzed result to the information checking unit 103, and the information checking unit 103 checks whether or not the information retaining unit 102 retains this information by referring to this information retaining unit 102 (S204). As a result of the check, if retaining the information (S205—YES), the information retaining unit 102 sends this purport back to the request processing unit 101. The request processing unit 101 extracts the requested information from the information retaining unit 102, and requests the response generating unit 105 to generate an "information response" (which is herein defined as a "response message containing the requested information") together with this information. The response generating unit 105 generates the information response and sends this response back to the request processing unit 101 (S206). The request processing unit 101 sends the received response back to the terminal device 110.

If the information retaining unit 102 does not retain the information (S205—NO), the request processing unit 101 requests the response generating unit 105 to generate a "sleep response" (a response for notifying the sleep time when not retaining the information). Upon receiving this request, the response generating unit 105 requests the sleep time calculation unit 106 to calculate the sleep time. The sleep time calculation unit 106 calculates the sleep time from the information accumulated in the communication information retaining unit 104 (S208). Note that the calculation method will be described later on.

The response generating unit 105, when receiving the calculated sleep time, generates the sleep response (S209) and sends the generated response back to the request processing unit 101. The request processing unit 101 sends the received sleep response back to the terminal device 110 (S210).

The terminal device 110 receiving this sleep response may transition to the sleep state for the predetermined period of time contained in the above response. As a matter of course, the assumption is that the terminal device 110 returns to the reception-enabled status of the information via the network after an elapse of the predetermined time.

Note that the sleep time is calculated and contained in the sleep response, and nevertheless the sleep response may simply contain a sleep instruction (an instruction of the transition to the sleep status) without calculating the sleep time in the first embodiment. In this case, the terminal device 110, when detecting the sleep instruction, determines the sleep time by an arbitrary method and may thus be slept. For instance, the terminal device 110 may be slept for a predetermined period of fixed time and may also be slept for a period of time determined at random, and the sleep time may be determined based on, when a size of the acquisition-requested information can be acquired, this information size. Alternatively, the terminal device 110 may be started up by a startup instruction given from the communication device 100. For example, the communication device 100 calculates the sleep time as described above and may transmit, after transmitting the sleep response containing the sleep instruction to the terminal device 110 and when the sleep time elapses, the startup instruction to the terminal device 110.

The request processing unit 101 acquires, after transmitting the sleep response, the information specified in the request from the server device 111 (S211). At this time, information on the communications (the details thereof will be described later on in relation to a sleep time calculation method) is recorded. If normally acquired, the communication information retained in the communication information retaining unit 104 is updated (S212). Further, the information acquired from the server device 111 is retained on the information retaining unit 102 (S213). Upon completing the acquisition process, the request processing unit 101 generates the information response by use of the response generating unit 105 and sends the response back to the terminal device 110 (S206-S207).

What has been described so far is the basic operation of the communication device 100.

Specific Example Using HTTP in First Embodiment

Subsequently, the request received by the communication device 100 and the response thereto will be described by taking HTTP (HyperText Transfer Protocol) for example.

FIG. 3(A) shows an example of the request transmitted by the terminal device 110. In response to this request, the information transmitted by the server device 111 is roughly any one of responses in FIGS. 3(B)-3(C). FIG. 3(B) shows the response in the case of the information existing, while FIG. 3(C) shows the response in the case of the information not existing. The communication device 100, in the case of transparently executing the process between the terminal device 110 and the server device 111, handles the request and the response according to such a format.

On the other hand, in the case of installing an explicit HTTP proxy between the terminal device 110 and the server device 111, the terminal device 110 transmits the request as in FIG. 3(D). Corresponding to this request, similarly to what has been described earlier, the response in FIG. 3(B) or 3(C) is received from the HTTP proxy. The communication device 100, in the case of functioning as the explicit HTTP proxy, handles the request and the response in this format. The communication device 100 is applicable to whichever format.

Hereafter, the communication device 100 functions as the transparent or explicit HTTP proxy as explained above. Then, the communication device 100 handles the "sleep response" in addition to the response message. FIG. 3(E) shows an example of the sleep response. The sleep response is allocated with a dedicated code number (which is 103 in this example) representing a purport thereof and has a characteristic that an HTTP header contains the sleep time (Sleep-Time header, the time is $T_1$). Moreover, if taking into consideration a possibility that the communications might be cut off when the terminal device 110 receiving the sleep response transitions to the sleep status, the identifying information for associating the sleep response with a subsequent information response may be attached.

Furthermore, the response in the format in FIG. 3(B) is handled as the "information response" that is sent back if the communication device 100 retains the information (S205—YES). This response may also be attached with the identifying information for associating the sleep response with the information response stated earlier.

Specific Example Using HTTP in First Embodiment

Processes in S203-S204

Subsequently, the request analysis in step S203 will be described. The communication device 100, when receiving the request from the terminal device 110, specifies the request target. To be specific, if being the format in FIG. 3(A), the information tagged with "I" is extracted from "GET/HTTP/1.1", and www.example.com is extracted from "Host: www.example.com". Thereafter, two information elements are combined to specify the URL (Uniform Resource Locator) (http://www.example.com/). If being the format in FIG. 3(D), http://www.example.com/ is extracted from "GET http://www.example.com/HTTP/1.1".

Step S204 is a process of checking whether the information determined by the URL specified based on the method exists in the information retaining unit 102 or not. The information retaining unit 102 functions as a database, and the determination as to whether the information exists therein or not is made by searching through this database with a search key using the URL or a value that can be derived from the URL. A method of managing the information in the information retaining unit 102 may take an arbitrary scheme.

Specific Example Using HTTP in First Embodiment

Processes in S211

The communication device 100, which has specified the should-be-acquired information, if the information retaining unit 102 does not retain this information, acquires the information from the server device 111 in step S211. This process is the same as the process executed by the normal HTTP proxy.

Specific Example Using HTTP in First Embodiment

Example of Communication Information Retaining Unit

Subsequently, the communication information retaining unit 104 used when calculating the sleep time in step S208 will be described.

The communication information retaining unit 104 is a database for saving the communication time expended when acquiring the information from the server device 111, a size of the acquired information, a throughput of the acquisition and the communication information such as RTT (Round Trip Time). These items of information are one example, and other items of communication information may also be retained. These items of communication information are retained in a proper granularity. For example, the information may be retained in a way that sorts the information in the form per URL, per server device 111 specified by the URL and per same network. In addition, the information may also be classified by taking account of a category of the requested information. That is, the information may be sorted such as "text data acquired from a server device A" and "JPEG image data acquired from the server device A".

As stated earlier, these items of information are properly updated when acquired from the server device 111 (step S212). On this occasion, the values related to the latest communication may also be retained, and other available values are values taking account of results of the past communications (e.g., a simple average value and a value weighted so that the newer the communication information is, the higher a ratio becomes).

In addition, the throughput and the RTT may be acquired by arbitrary methods. As already described, the throughput may be independently obtained from the transfer size and the transfer time in each session of communication and may also be measured by exchanging a throughput measurement packet between the target server device 111 and the communication device. Similarly, with respect to the RTT, if the RTT is managed by a TCP-based congestion control algorithm, a value thereof may also be used, and packets containing timestamp information for measuring the RTT (e.g., ICMP (Internet Control Message Protocol) Echo Request/Reply) may be sent to and back from the server device 111.

Specific Example Using HTTP in First Embodiment

Process in S208

The sleep time calculation unit 106 calculates the time expended for acquiring the information from the server device 111 by making use of the communication information accumulated on the communication information retaining unit 104 by the method described above. Herein the calculation methods thereof will be described.

A first method is an exceptional method not using the accumulated communication information. Some sort of fixed value is retained on the communication information retaining unit, and a fixed sleep time is sent back based on this value in response to whatever request. This fixed value may be determined arbitrarily by, e.g., a user of the communication device 100 and may also be set corresponding to an interval at which a peripheral communication device operates. For example, this can be attained by detecting the interval of occurrence of the communication process by the request processing unit 101, and setting this detected value.

A second method is a method of sending back the retained RU as the sleep time. According to this method, only a period of time till the first response packet is returned becomes the sleep time.

A third method is a method using an assumed size of the information and a throughput. The "assumed size of the information" connotes an average size obtained from the information acquired in the past or a typical size determined when designed. This assumed size is divided by the throughput up to the target server device 111, thereby calculating the time needed for the transfer. This value is set as the sleep time. Note that the throughput may involve using a value (calculated from the transfer time and the transfer size) recorded by acquiring the past information. It is to be noted that the assumed size of the information may involve employing the value notified from the server device 111. For instance, if the information for acquisition is presumed beforehand to be extremely large, the HTTP header field is processed before sending back the response and length information (Content-Length header) contained therein may be used.

A fourth method is a method of setting the previously retained communication time intact as the sleep time. The communication time depends largely on the size of the information to be acquired and a quality of a communication link. Therefore, in the case of adopting this method, it is preferable that the periods of sleep time are accumulated at granularity on a server-by-server basis and on a per information type basis.

Although these four methods are described herein, the calculation method is not necessarily limited to these methods. Usages of similar information and similar calculation methods do not deviate from the scope of the present invention.

First Embodiment

Other Supplementary Items

Although the previous description has discussed the transparent HTTP proxy and the explicit HTTP proxy, one of the differences therebetween lies in whether or not an IP address of the communication device 100 is used for the message to be transmitted and received. The transparent HTTP proxy does not use the IP address of the communication device 100. Hence, also when sending back the newly added sleep response, the response may be returned with a masqueraded IP address of the communication device 100. On the other hand, when operating as the explicit HTTP proxy, the response is returned by use of the IP address of the communication device 100.

Further, the description of the first embodiment has discussed the example of the realizing method using the HTTP. However, the communication protocol for use is not limited to the HTTP. For example, other communication protocols such as FTP (File Transfer Protocol) and SIP (Session Initiation Protocol) may also be employed. In addition, the communication protocol for acquiring the information does not necessarily need to be the same as the communication protocol used for transmitting the sleep response. For instance, such a contrivance can be taken that the information is acquired based on the HTTP, while the sleep response is transferred based on the ICMP. In the case of using the ICMP, a new ICMP type code may be defined.

Further in the first embodiment, if the information requested by the terminal device 110 to be acquired is not retained on the information retaining unit 102, this information needs to be acquired and is therefore acquired from the server device 111, and the terminal device is notified of the sleep response. By way of another example, as described above, the information exceeds the period of validity though retained on the information retaining unit 102, or the fixed period of time elapses after being acquired, in which case the information is determined to have a possibility of its being updated by the server device 111. In this case, the information needs to be acquired and is therefore acquired from the server device 111, and the terminal device may also be notified of the sleep response. Moreover, if the requested information is not allowed to be sent back to the terminal device 110 and even when not accumulated, it may be determined that this information has no necessity for the acquisition. Thus, in the first embodiment, it is determined based on the predetermined conditions whether or not the information requested by the terminal device to be acquired needs to be acquired from the server device, if necessary for acquiring, the information is acquired from the server device 111, and the sleep response is notified to the terminal device.

What has been discussed so far is the first embodiment of the communication device 100.

Second Embodiment

Description of Components

Figure 4:
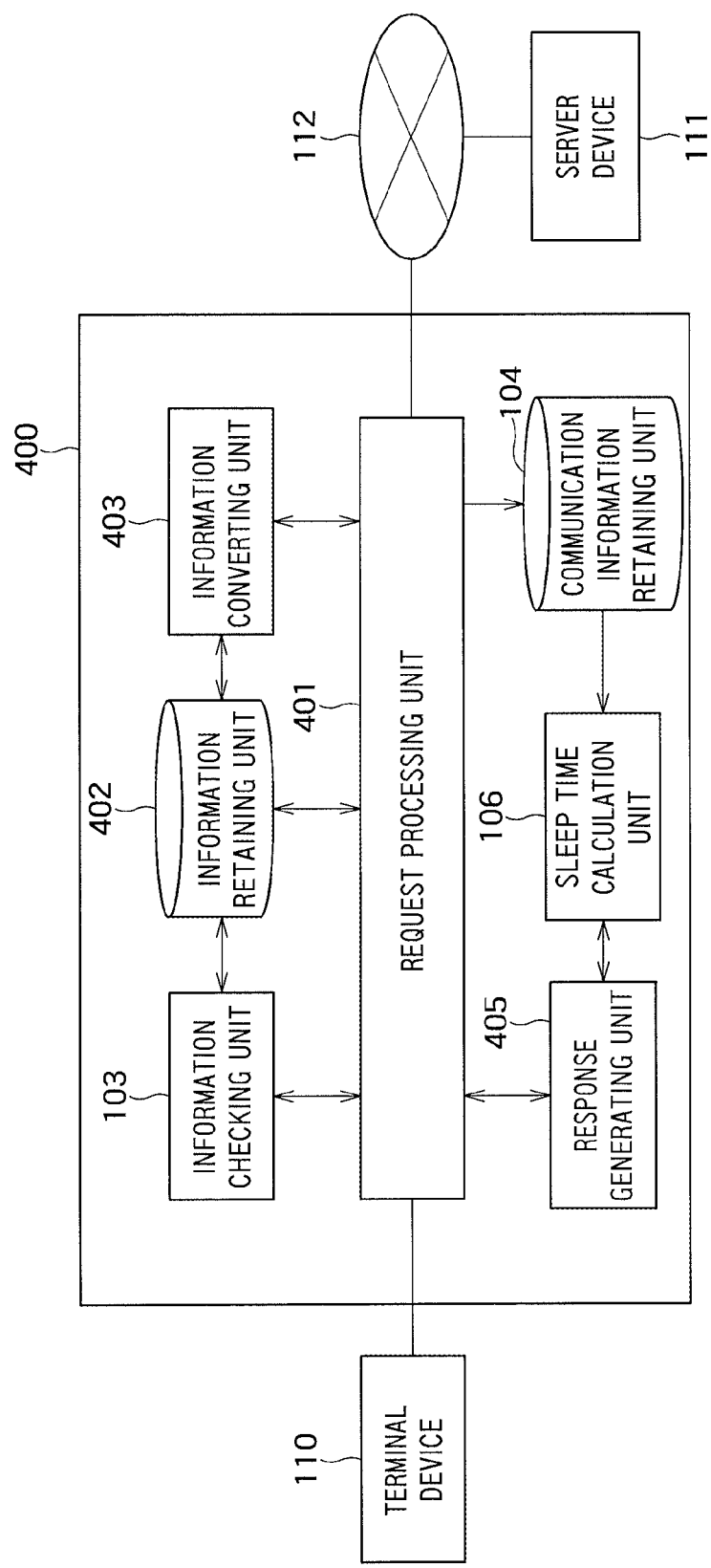
FIG. 4 is a functional block diagram of the communication device according to a second embodiment.

Subsequently, a second embodiment will be described. The second embodiment incorporates, in addition to the functions demonstrated in the first embodiment, a function of transmitting the response for prompting the terminal device 110 to access a specified item of information. FIG. 4 shows a functional block diagram of a communication device 400 in the second embodiment. Note that the components incorporating the same functions as those in FIG. 1 are marked with the same numerals and symbols, and their explanations are omitted.

A newly added information converting unit 403 incorporates a function of converting the information acquired from the server device 111 into a format suited to the terminal device 110. Herein, the phrase "being suited" implies becoming a data size or a data format enabling the terminal device 110 to display or process the data by reducing a display size or by an operation of compressing a part of information. The converted information is stored in an information retaining unit 402 similarly to other items of information. Note that the information converting unit 403 generates a key for distinguishing between the items of information (converted information). The key is to be derived from the URL of the information, the information (the IP address, a port number, the communication protocol for use and a screen size of the terminal device) of the terminal device 110 and a converting condition, and is set different from an original key (the key before being converted). The thus-generated key is used in the information retaining unit 402 and is conveyed also to a request processing unit 401 for getting the key contained in the sleep response. Note that there may be provided a storage (unillustrated) for retaining the original key, the generated key and the information related to the terminal device 110 in a proper format in the way of their being associated with each other.

The information retaining unit 402 is characterized by saving together the information converted by the information converting unit 403 in addition to the original information.

The request processing unit 401 incorporates, in addition to the functions of the request processing unit 101 in the first embodiment, a function of determining whether the conversion of the information is required or not by deciding a type of the terminal device 110 (e.g., deciding whether or not the terminal device 110 corresponds to a predetermined mobile terminal such as the smartphone). If determining that the conversion of the information is required, an instruction is issued to the information converting unit 403. This instruction may contain parameters (such as the image size, the requirement or non-requirement of segmenting the information and the data size transmitted in response to one acquisition request when segmenting the information) characterizing the post-converting information. Furthermore, if determining that the conversion is required, on the occasion of giving an instruction of generating the sleep response to a response generating unit 405, the instruction is issued to generate such a response as to refer to the post-converting information.

Second Embodiment

Description of Operation Sequence

Figure 5:
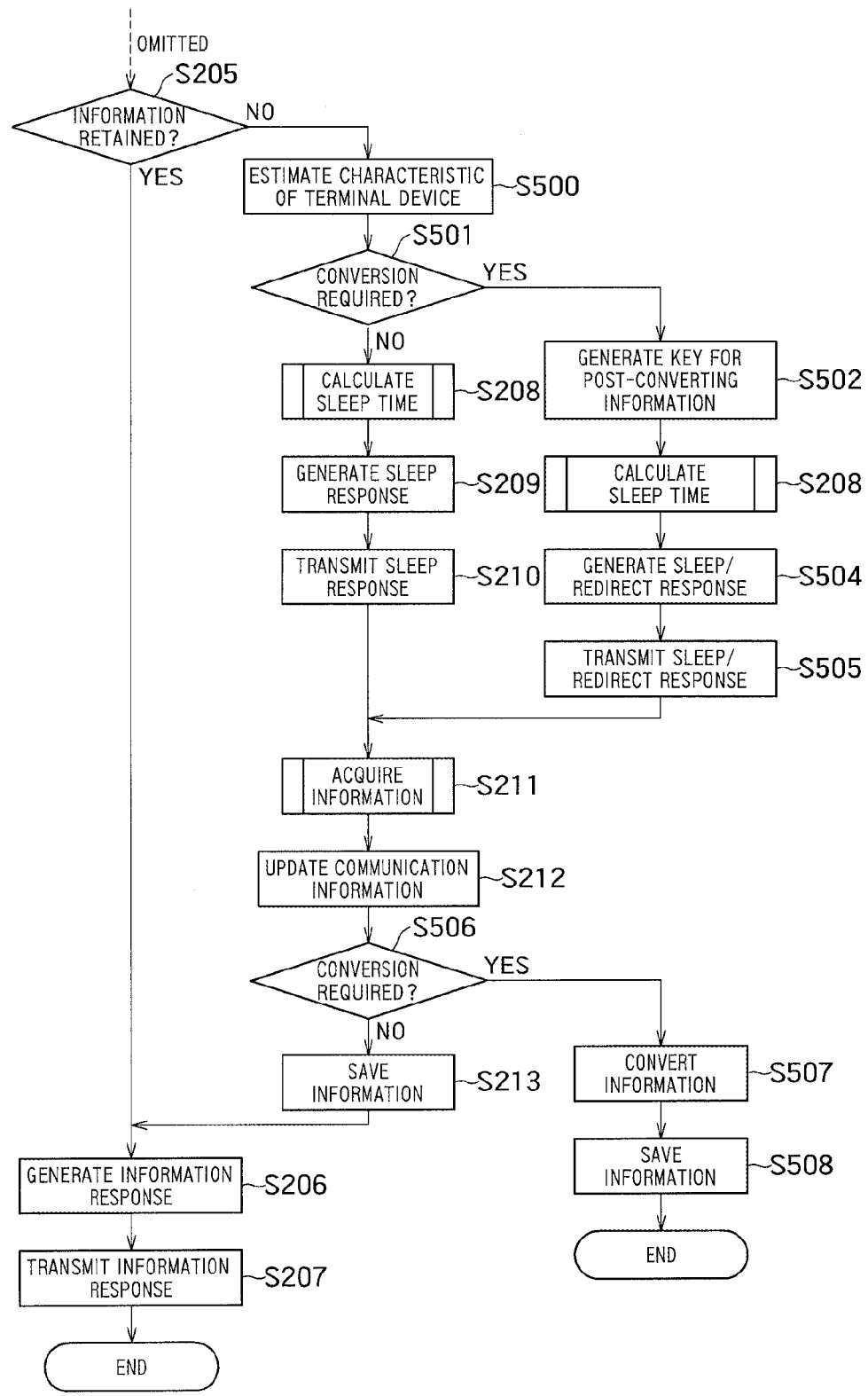
FIG. 5 is a diagram of an operation sequence in the second embodiment.

FIG. 5 illustrates an operation sequence in a second embodiment. Incidentally, the portions common to those in the first embodiment are omitted, and the steps with processing contents remaining unchanged are marked with the same numbers.

If the communication device 400 does not retain the requested information (step S205—NO), a process of estimating the characteristic of the terminal device 110 is executed (S500). This process may involve using User-Agent information contained in the header when taking the HTTP for example.

It is determined based on the estimation whether the conversion is required or not (step S501). A condition of this determination is to be statically saved on a storage (unillustrated). If the conversion is not required (S501—NO), the operation is finished by executing the same process as in the first embodiment. Whereas if the conversion is required (S501—YES), a variety of processes needed for the conversion are carried out.

At first, the request processing unit 401 requests the information converting unit 403 to generate a new key. The information converting unit 403 generates, based on the URL for specifying the target information, the information of the terminal device 110 and the converting condition (converting method), the new key for specifying the post-converting information (step S502). The generated key is returned to the request processing unit 401. The request processing unit 401 instructs the response generating unit 405 to generate a "sleep/redirect response" together with the notified key. The response generating unit 405 obtains the sleep time by use of the sleep time calculation unit 106 (S208), and generates the sleep/redirect response by employing the information thereof (S504). The generated sleep/redirect response is sent back to the request processing unit 401 and is transmitted to the terminal device 110 from the request processing unit 401 (step S505).

Figure 6:
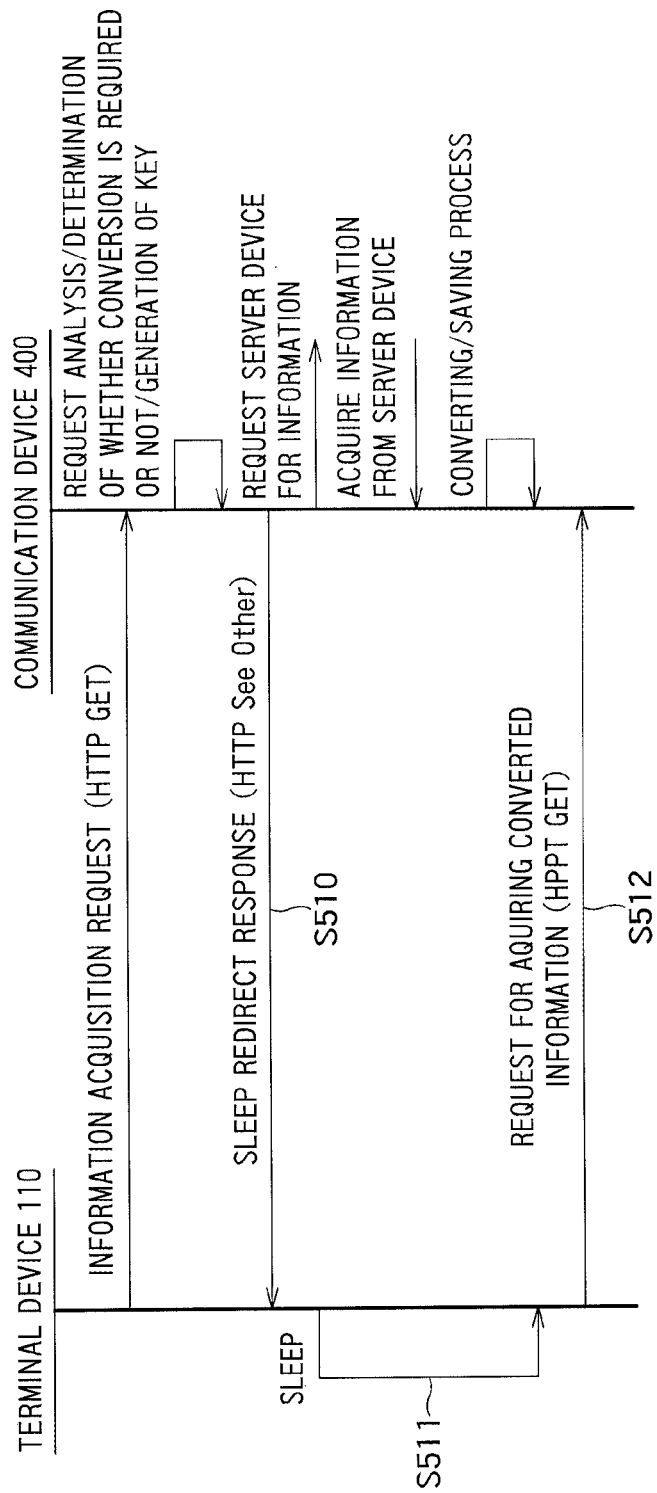
FIG. 6 is a diagram of an operation sequence of the communication device with respect to a sleep/redirect response.

After transmitting the sleep/redirect response, the information is acquired from the server device 111 in the same way as in the first embodiment. After acquiring the information, if determining that the conversion is not required (S506—NO), the operation is finished after returning the response in the same way as in the first embodiment (S206, S207). Whereas if determining that the conversion is required (S506—YES), the request processing unit 401 instructs the information converting unit 403 to convert the received information. The information converting unit 403 converts the information on the basis of the converting condition referred to in step S502 (S507). The converted information is saved in the information retaining unit 402 together with the original information (step S508). Thereafter, unlike the first embodiment, the operation comes to an end. In the case of transmitting the sleep/redirect response, an assumption is that the acquisition request for the information notified in this sleep/redirect response is received from the terminal device 110. Hence, there is no necessity for directly transmitting the original information and the converted information. FIG. 6 illustrates an operation sequence of the terminal device 110 with respect to the sleep/redirect response. The terminal device 110 receiving the sleep/redirect response (S510) sleeps for only the time contained (specified) in the response, thereafter starts up and transmits the request for acquiring the converted information to the communication device 400 (S512).

Second Embodiment

Description of Sleep/Redirect Response

The "sleep/redirect response" used in the second embodiment with be described by taking the case of employing the HTTP for example. The sleep/redirect response is what the sleep time as in FIG. 3(E) is added to the HTTP-based sleep/redirect response (status code: 303). FIG. 7 shows one example thereof.

Second Embodiment

Other Supplementary Items

In the description of the second embodiment, the information retaining unit 402 saves both of the original information and the information converted for the terminal device 110. However, only one of the original information and the converted information may be retained by taking account of the size necessary for retaining the information. For example, only the original information is accumulated in the information retaining unit, and the converting process may be executed each time when generating the response. Conversely, only the converted information is retained, and the unconditionally converted information may be returned in response to the subsequent information acquisition request. Note that only the converted information is stored, and reversed conversion (e.g., the size is converted back to the original size. The image quality might deteriorate) can be done when in transmission.

The description of the second embodiment has discussed the configuration that the sleep/redirect response is generated, and the new information acquisition request is invariably received. Nonetheless, in view of costs (the time, the electric power, etc.) expended for making the request again, the implementation may be done so that the directly converted information is transmitted as the response without making the request again. In this case, it follows that the generation of the response (step S206) and the transmission process (step S207) are continued after step S508.

The description of the second embodiment has discussed the case of converting all items of information requested by the terminal device 110. However, the embodiment may also be realized in a way that converts some items of the information without converting another part of information. For instance, such a process may be conducted as to convert only the image file without converting the HTML file. In the case of not converting the HTML file, it may be sufficient to return the sleep response to the HTML file and send back the post-converting image file when the individual image file is requested. Further, also in the case of converting the HTML file, such a method can be also taken as to rewrite the URL to the image file described in this HTML file so that the post-converting image is acquired.

Third Embodiment

Subsequently, a third embodiment will be described. The third embodiment is what adds a prefetching function of acquiring components of a web page beforehand to the first or second embodiment. Note that the prefetching function described herein indicates a function of previously acquiring embedded objects (an image file, script file, a style sheet, etc.)

referred to from the HTML file requested first. It does not mean that information is acquired unconditionally.

Third Embodiment

Description of Components

Figure 8:
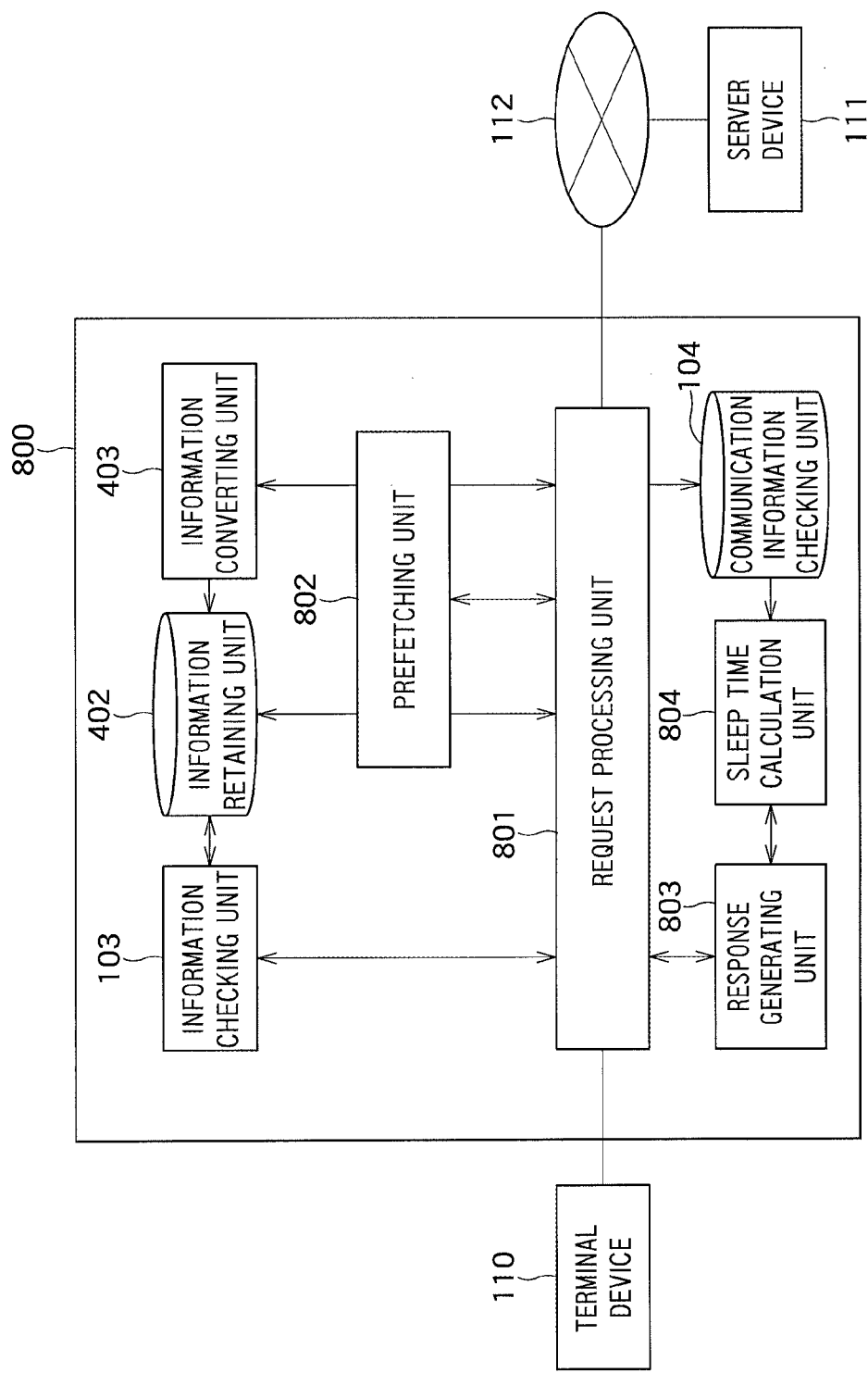
FIG. 8 is a functional block diagram of the communication device according to a third embodiment.

FIG. 8 shows a functional block diagram of a communication device 800 in the third embodiment. As compared with the second embodiment, a prefetching unit 802 is added. The prefetching unit 802 generates the information acquisition request in place of the terminal device 110. The request generated on this occasion is a request for the information recursively requested from the information acquired from the server device 111 on the basis of the request accepted by a request processing unit 801.

Such a case is considered that the web page is requested based on, e.g., the HTTP. The web page is organized by the HTML file providing a layout and character information of the web page, the style sheet providing the information on a page design, the script file and the image file. The terminal device 110 cannot precisely display the web page unless acquiring all these files. Normally, the terminal device 110 does not grasp that the style sheet, the script file and the image file are referred to until acquiring at first the HTML file and analyzing contents thereof. Therefore, a multiplicity of acquisition requests is sequentially generated, resulting in a decline of communication efficiency.

The prefetching unit 802 functions when the request received by the request processing unit 801 is the request for the HTML file. The HTML file is received from the request processing unit 801 and analyzed. Then, other files referred to are specified, and the requests for these files are sequentially generated independently of the request of the terminal device 110. The acquisition requests are transmitted to the server device 111 via the request processing unit 801 and processed in the same way as in the first or second embodiment.

Third Embodiment

Description of Operation Sequence

Figure 9A:
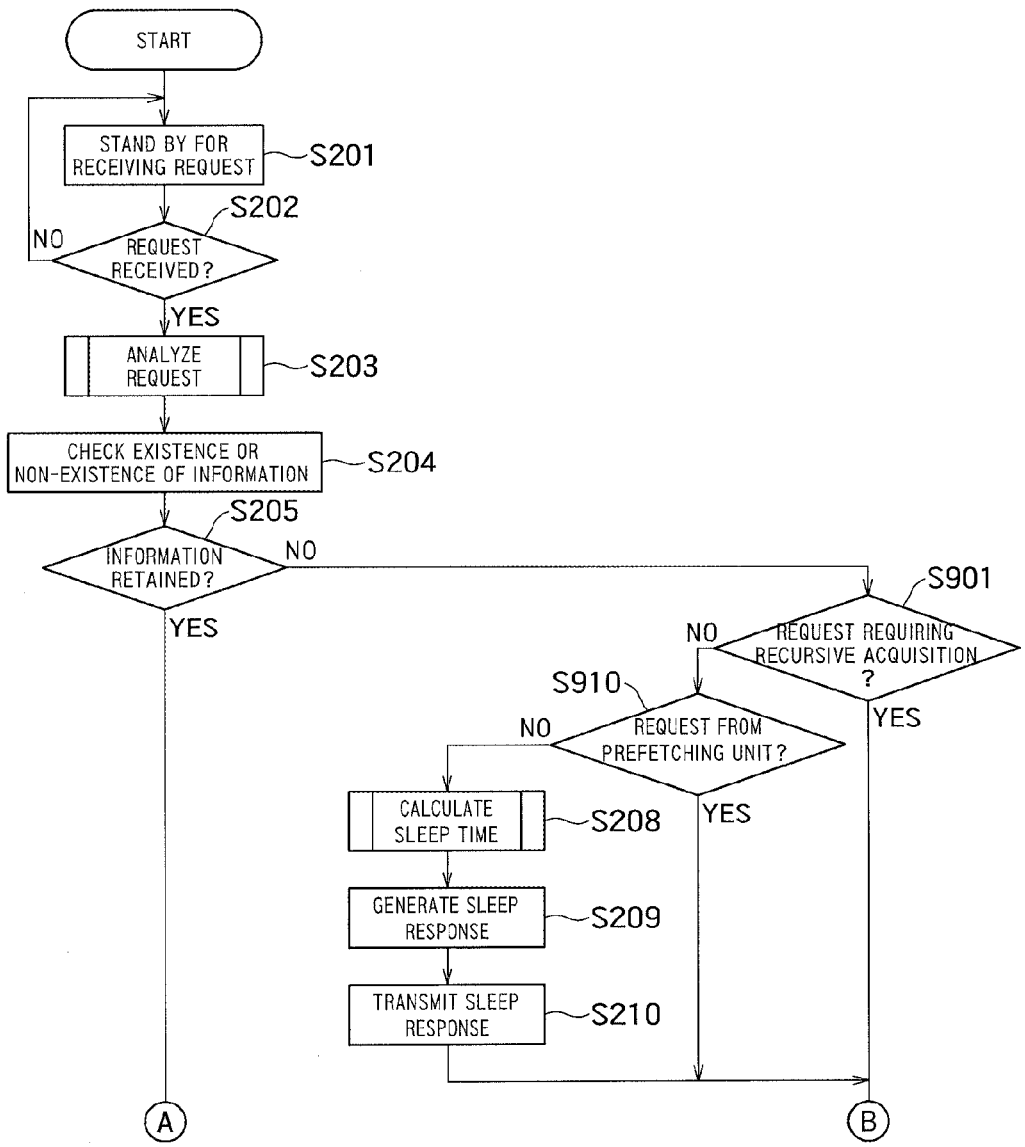
FIG. 9A is a diagram showing an operation sequence in a third embodiment.
Figure 9B:
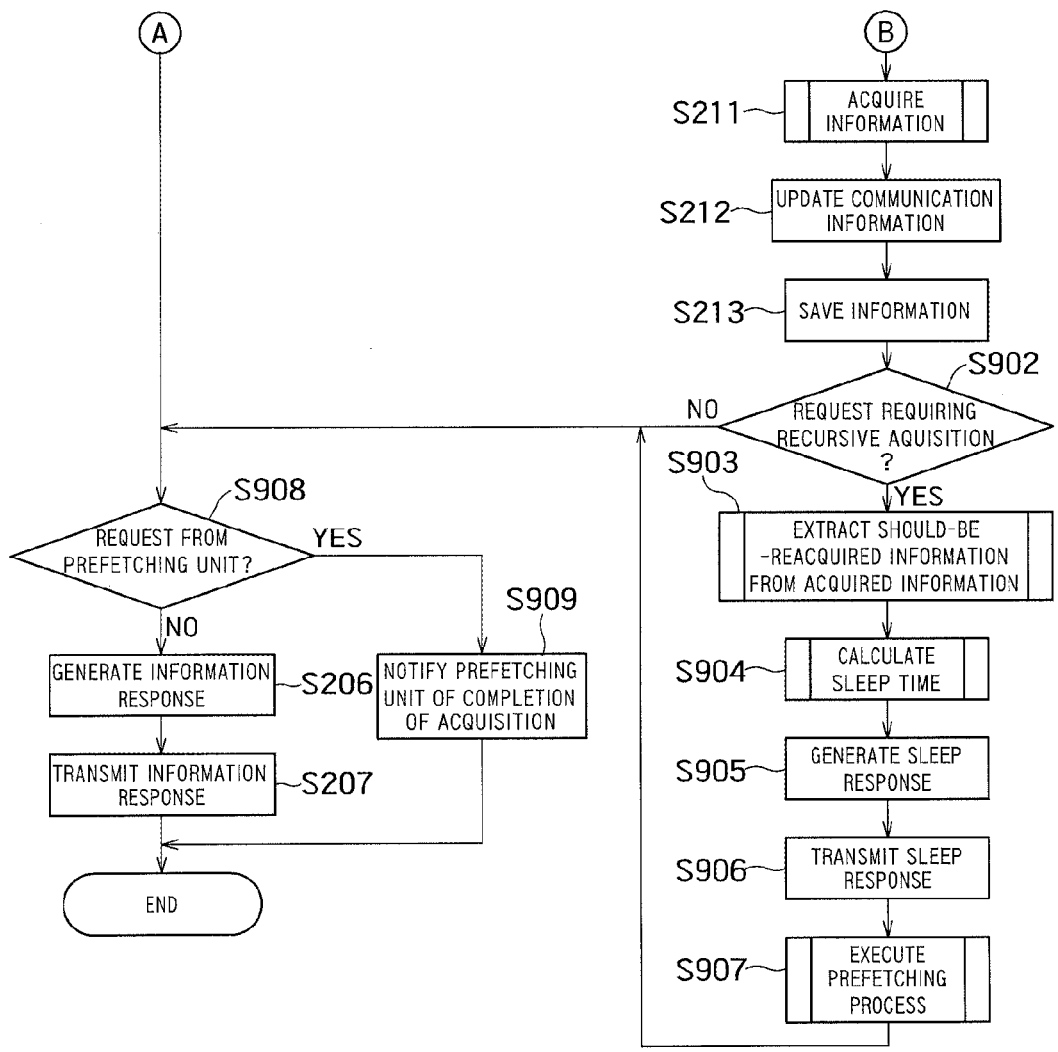
FIG. 9B is a diagram showing the operation sequence continued from FIG. 9A.

FIGS. 9A and 9B show an operation sequence in the third embodiment. These drawings are what adds functions to the first embodiment, and yet these functions can be likewise added to the second embodiment. Note that the components realizing the same functions as those given so far are marked with the same numerals and symbols.

If the information retaining unit 402 does not retain the requested information (S205—NO), it is determined in step S901 whether or not the information acquired from the server device 111 needs the recursive acquisition of the information. For instance, it is determined whether the information requested for its acquisition is the HTML file or not (as described earlier, the image file etc. contained in the HTML file needs to be recursively acquired).

Only if the recursive acquisition is not required (S901—NO) and if not being the request from the prefetching unit (S910—NO), the same processes as those (S208-S210) in the first embodiment are executed. Thereafter, similarly to the first embodiment, the requested information is acquired (S211-S213). Moreover, if the recursive acquisition is required (S901—YES) or if being the request from the prefetching unit (S910—YES), similarly to the first embodiment, the requested information is acquired (S211-S213). The case of S901—YES (the case of requiring the recursive acquisition) is instanced by the case in which the acquisition request is related to the HTML file. Further, the case of S910—YES (the case in which the request is given from the prefetching unit) is instanced by the case where the acquisition request for the recursively acquired information is received from the prefetching unit in this operation flow.

After acquiring the information, the processing is different depending on whether the recursive acquisition is required or not. If the recursive acquisition process is not required (S902—NO), it is checked whether the request is issued by the prefetching unit 802 or not (S908). If not from the prefetching unit 802 (S908—NO), similarly to the first embodiment, the response is returned (S206, S207), and the processing is finished. Whereas if the request is given from the prefetching unit 802 (S908—YES), there is no necessity for sending back the information itself, and hence the prefetching unit 802 is notified of a purport that the acquisition is completed (S909), and the processing comes to an end.

If determining that the recursive acquisition of the information is needed (S902—YES), the request processing unit 801 notifies the information (first information) acquired in S211 to the prefetching unit 802. The prefetching unit 802 analyzes the first information and extracts information (second information) that should be recursively acquired (S903). Thereafter, the extracted second information is sent back to the request processing unit 801.

The request processing unit 801 notifies, to a response generating unit 803, the second information received from the prefetching unit 802, and requests the response generating unit 803 to generate the sleep response. The response generating unit 803 notifies the notified second information to a sleep time calculation unit 804, and requests the sleep time calculation unit 804 to calculate the sleep time. The sleep time calculation unit 804 calculates total acquisition time when acquiring the notified second information (all the information in the case of the plural items of information), and returns the calculated time to the response generating unit 803 (S904).

The response generating unit 803 generates the sleep response by use of the received sleep time, and sends back the sleep response to the request processing unit 801 (S905). The request processing unit 801 transmits the received sleep response to the terminal device 110 (S906). Thereafter, the second information undergoes the prefetching process (S907). Note that if the present communication device is capable of executing the plurality of processes in parallel, the processes related to the sleep response (S904-S906) and the prefetching process may be executed in parallel. An in-depth description of the prefetching process will be made later on.

Upon completing the prefetching process, post-processing is carried out. The information response with respect to the first information requested first is generated (S206) and transmitted toward the terminal device 110 (S207). It is to be noted that the second information is transmitted upon receiving the acquisition request for the second information from the terminal device 110 (YES in S201-S205, NO in S908, S206, S207).

Note that the sleep response (containing, e.g., the sleep time based on the time expended for acquiring the first information) may be returned by executing the same processes as steps S208-S210 when the result is YES in step S901 by way of a modified example of the operation flow. This contrivance enables the power consumption to be further reduced by setting the terminal in the sleep status during the period for acquiring the first information as well as during the period for acquiring the second information.

Third Embodiment

Description of Prefetching Process

Subsequently, the prefetching process (S907) in the third embodiment will be described in detail. Herein, though the discussion will be made by taking a web page as an example in order to facilitate the understanding, the same handling manner can be applied to other formats needed for recursively acquiring the information. As the other formats, there are, for example, a text file in which one or more URLs for acquiring information are described, a file in which update information such as RSS is described, a web service based on the file, or the like.

In the case of accepting the request for acquiring the web page from the terminal device 110, the first information becomes the HTML file. The HTML file contains a multiplicity of tags some of which are the tags for referring to external files (the style sheet, the script file, the image file, etc.). The URLs embraced by these tags are extracted and properly listed in step S903. FIG. 10 illustrates one example of the tags as an extraction target.

The prefetching unit generates the acquisition request according to predetermined standards with respect to the list of the extracted URLs, and notifies the acquisition request to the request processing unit 801. The request processing unit 801 processes the request in the same way as the acquisition request given from the terminal device 110. That is, the information is properly accumulated on the information retaining unit 402. Provided that the request is given from the prefetching unit 802 as diverted from step S910 and from step S908, neither the sleep response (sleep/redirect response) nor the information response is transmitted. Moreover, before generating the request, if the information proves to be already accumulated in the information retaining unit 402 by checking the accumulation state in the information retaining unit 402 via the information checking unit 103, the acquisition request may not be generated.

After acquiring and accumulating the information about all the extracted URLs, the prefetching process is terminated.

Third Embodiment

Prefetching Sequence

For example, the following methods can be applied to a sequence of prefetching the extracted second information. The usages of other methods do not deviate from the scope of the present invention. Further, these methods may be changed for every server device 111 that provides the information and per URL. Conditions necessary for realizing the above shall be properly saved in an unillustrated storage.

A sequence of occurrence in the information of an extraction source.

A sequence (e.g., the style sheet→the script file→the image file→the moving picture file) determined beforehand per category of the information.

A sequence from the smallest to the largest in an estimated file size of the information (the estimated file size connotes a size determined per category of the information on the basis of the past acquisition information etc. The size of the information acquired in the past is to be properly saved on an unillustrated storage).

Third Embodiment

Sleep Time Calculation Method in the Case of Executing Prefetching

The sleep time calculation method in the third embodiment is different from the method in the first or second embodiment. In the first and second embodiments, an approximate period of time needed for acquiring one item of information is calculated as the sleep time.

In the third embodiment, the time expended for acquiring all the information requiring the recursive acquisition in order to perform prefetching is calculated as deemed to be the sleep time.

The basic calculation method is pursuant to the method described in the first embodiment, in which the periods of time are added together by the number of pieces of should-be-acquired information. Provided that the prefetching unit 802 acquires the plural pieces of information simultaneously, the simple addition cannot be done. For example, with respect to the first method (using the fixed value) described in the first embodiment, some lengths of sleep time may also be defined corresponding to the total number of pieces of information to be acquired.

Further, the following method is available.

$$\{\Sigma(\text{Fixed Value for Each Piece of Information}) \div (\text{Parallelism})\} + \alpha$$

With respect to the second method (using the RTT) described in the first embodiment, the following method is considered.

$$(\text{RTT} \times \text{Number of Pieces of Information for Acquisition}) \div (\text{Parallelism}) + \alpha$$

With respect to the third method (using the assumed size and the throughput) (which is described in the first embodiment), the following method may be adopted by taking into consideration that the throughput is fixed.

$$\Sigma(\text{Assumed Size for Each Piece of Information}) \div \{(\text{Throughput}) \div (\text{Parallelism})\} + \alpha$$

With respect to the fourth method (in which the retained communication time is set intact as the sleep time) described in the first embodiment, it is considered that the periods of communication time taking account of the parallelism will have already been accumulated, and hence the addition may simple be performed.

Third Embodiment

Case of Combination with Second Embodiment

The description made earlier has discussed the case of the combination with the first embodiment, and yet the combination with the second embodiment can be also attained. In this case, a process of properly converting the information acquired in S211 of FIG. 9B is added, and the response generated in S904-S906 may be set as the sleep/redirect response. Further, the second information acquired by the prefetching unit 802 may be, after properly undergoing the execution of the conversion process, accumulated in the information retaining unit 402.

Third Embodiment

Other Supplements

In the description made so far, the time expended till acquiring all the information is calculated as the sleep time.

However, in a case where an extremely long period of time is required if acquiring all the information (the case where, e.g., the moving picture file etc. is considered to be included), and in a case where an information retaining unit 1307 is considered to lack in storage capacity (the case where the information retaining unit 1307 implements the capacity limitedly), a value different from the time expended for acquiring all the information may be used as the sleep time. Namely, this value (sleep time) is exemplified by a period of predetermined upper limit time and a period of time needed when receiving the data equivalent to a size (which is a size of an available space of the information retaining unit, or a size of an available space of the buffer used in the communication process such as transmitting and receiving frames) of a memory area usable with an assumed throughput.

Note that in the case of notifying the sleep time such as this, the communication device 800 may indicate that there is a subsequent information response by transmitting the information response containing a part of information to the terminal device 110. Considered, e.g., are a method of temporarily stopping only the transfer while continuing to retain the TCP connection without disconnecting the TCP connection during each session of data transfer, and a method of performing the HTTP-based response on a small unit basis. Furthermore, the information on the sleep time is added to each information response, and the terminal device 110 may be prompted to transition to the sleep status for every acquisition of the information.

Fourth Embodiment

In the embodiments discussed so far, the sleep-enabled time is included in the sleep response and the sleep/redirect response. In a fourth embodiment, a total data size is returned. A terminal device 1104 receiving this response determines the sleep time on the basis of a received data size. For example, a function or a table each retaining an association between the data size and the sleep time is prepared, in which the sleep time may be determined from this table and the received data size. The table may be provided from the communication device and may also be registered by the user. Alternatively, the data size and the time expended for receiving the data of this data size are recorded from the past communications of the terminal device itself, and the sleep time may also be calculated based on this record.

Fourth Embodiment

Description of Components

Figure 11:
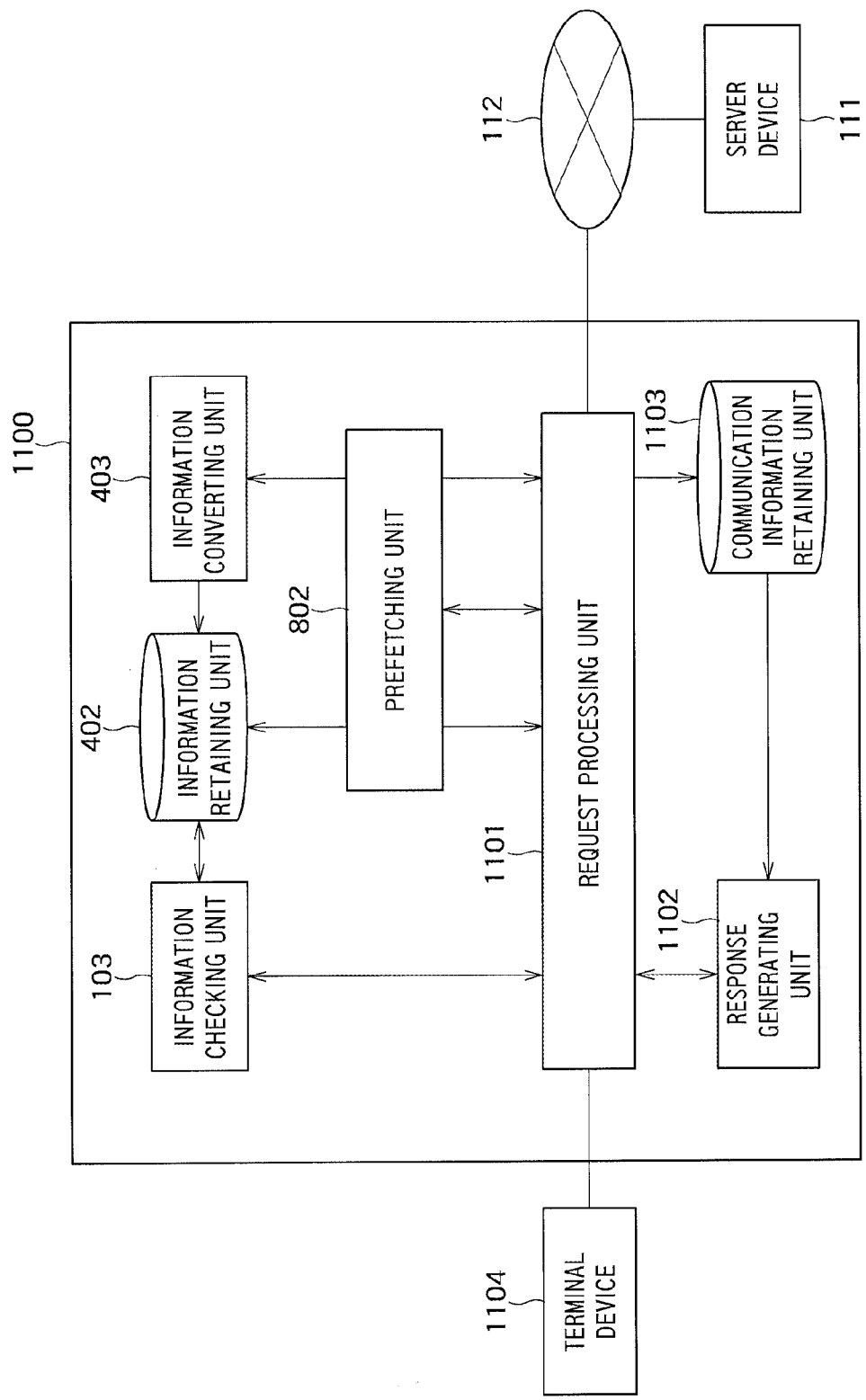
FIG. 11 is a functional block diagram of the communication device according to a fourth embodiment.

FIG. 11 illustrates a configuration of a communication device 1100 actualizing the fourth embodiment. Different points are a request processing unit 1101, a response generating unit 1102 and a communication information retaining unit 1103.

A change point of the request processing unit 1101 lies in transmitting the response taking a format that the sleep response or the sleep/redirect response contains the total data size. Further, the case of making use of the past information for calculating the total data size entails a function of sequentially recording the data size of the information acquired in the communications.

A change point of the response generating unit 1102 lies in generating the response containing the total data size in place of the sleep time. The information on the data size is acquired from the communication information retaining unit 1103 by use of the list of the second information (the information that should be prefetched) notified from the request processing unit 1101.

It is indispensable that the communication information retaining unit 1103 retains the information on the data size. This information may be, as described in the first embodiment etc., updated whenever performing the communication and may also involve fixedly using a value determined when designed.

Fourth Embodiment

Description of Components

FIG. 12 shows an example of the response generated by the response generating unit 1102. A case of not exploiting the converting function (corresponding to "the first embodiment+the prefetching function") is shown in an upper part of FIG. 12, while a case of exploiting the converting function (corresponding to "the second embodiment+the prefetching function") is shown in a lower part of FIG. 12. In either case, a header "Total-Length" is added, and "S" is set as a value thereof. As described earlier, the value "S" is given as follows.

$S=\Sigma S_i (S_i$ is the size of the second information)

Fifth Embodiment

A fifth embodiment exemplifies a mode of incorporating the function of the communication device described so far into the terminal device. It should be noted that the case of incorporating the function of the communication device illustrated in the third embodiment into the terminal device will be described herein, and nevertheless the function can be likewise incorporated even in other embodiments.

Fifth Embodiment

Description of Components

Figure 13:
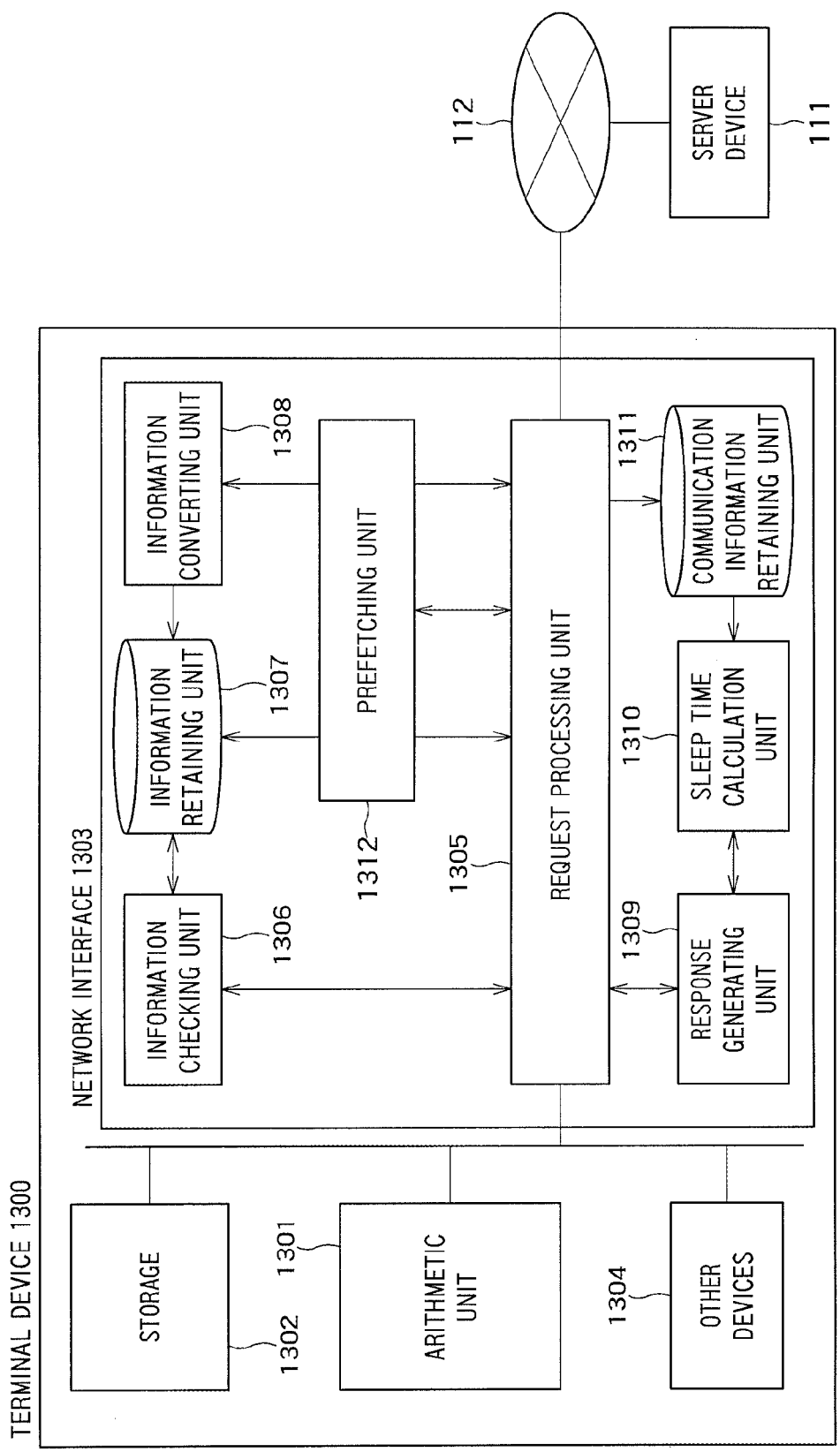
FIG. 13 is a functional block diagram of the communication device according to a fifth embodiment.

FIG. 13 shows a configuration of a terminal device 1300 in the fifth embodiment. The terminal device is configured to include roughly four blocks. These blocks are an arithmetic unit 1301, a storage 1302, a network interface 1303 and other devices 1304.

The arithmetic unit 1301 is a processor on which the OS controlling the terminal device and application software (e.g., the web browser) run. The storage 1302 includes a memory and a large capacity storage that are stored with the information and the program that are used by the arithmetic unit 1301. The network interface 1303 is a network interface mounted with the same elements as the elements of the communication device in the third embodiment. Other devices 1304 are other devices not shown in FIG. 13 and exemplified such as a display controller and a USB controller. The arithmetic unit 1301 controls the whole terminal in a way that includes controlling the network interface by reading the program from the storage 1302 and executing this program.

An internal structure and the operation of the network interface 1303 are pursuant to the third embodiment. However, the following points are different.

A first change point is that the acquisition request is received via the network from the terminal device 110, and, by contrast, the instruction is given directly from the arithmetic unit in the fifth embodiment. The instruction given from the arithmetic unit 1301 is generally realized in such a form that the arithmetic unit 1301 instructs a device driver of the network interface 1303 to make a conversion into a proper form and thus gives the instruction to the network interface 1303.

A second change point is that the response given from the request processing unit 1305 is transmitted not via the network but via the internal bus etc. All of the sleep response, the sleep/redirect response and the information response are target responses.

A supplement of the second change point is as follows. Other embodiments discussed so far are focused on the case of transmitting the sleep time by use of the same communication protocol as that of the information response. However, in the fifth embodiment, the arithmetic unit 1301 is connected to the network interface 1303 via the internal bus etc., and hence such a method is available as to notify the sleep time by use of the register and to return the information response by employing the internal bus (the conventional methods are also available). The register can be built in, e.g., the request processing unit 1305. In the case of taking this method, the sleep notification can be done independently of the operation of the communication protocol. Hence, after the sleep time has been once notified, this sleep time can be updated. For instance, even when the network status changed and when the network interface 1303 expended the time for acquiring the information, the sleep time can be updated to the optimal sleep time each time. The arithmetic unit 1301, though becoming temporarily the operation status, can transition again to the sleep status after checking the value of the register. Demonstrated herein is the case in which the arithmetic unit 1301 transitions to the sleep status, and yet the storage 1302 and other devices 1304 may also transition to the sleep status.

A third change point lies in notifying the arithmetic unit 1301, via an interrupt signal line and the register, that there exists the response given from the request processing unit 1305.

The following is a supplement of the third change point. As described about the supplement in the third embodiment, in a case where an extremely long period of time is expended for acquiring all the information and in a case where a usable size (capacity) of the information retaining unit 1307 is small, the sleep response containing the sleep time taking account of these points can be returned to the arithmetic unit 1301. Moreover, at a stage of acquiring a part of the information, the information response can be returned. On this occasion, a detection of becoming the status enabling the information response to be returned can be made by a method of requesting the arithmetic unit 1301 for the interrupt process from the network interface 1303, a method by which the arithmetic unit 1301 waking up at the notified sleep time polls the status of the specified register of the network interface 1303, and so on.

Fifth Embodiment

Other Descriptions

An operation sequence of the fifth embodiment is pursuant to the third embodiment and is therefore omitted.

Further, in the fifth embodiment, the sleep/redirect response is not necessarily needed. The post-converting data may be directly utilized without instructing the application to change the operation from outside because of establishing the direct connection via the internal bus. In this case, the sleep time notification based on the sleep/redirect response may be made by employing the register etc.

Sixth Embodiment

A sixth embodiment will discuss a case in which the server device implements a part of the functions incorporated into the terminal device in the fifth embodiment.

Sixth Embodiment

Description of Components

FIG. 14 illustrates a terminal device 1400 and a server device 1410 in the sixth embodiment. Note that illustration for components not related to directly the sixth embodiment are omitted in the server device 1410.

The terminal device 1400 has the same components as those in the fifth embodiment (the reference numerals are reallocated in terms of an appearance of the server device) except that the components related to the generation of the response are deleted. The following is a configuration of the server device 1410.

A storage 1415 is a large capacity storage that retains the information possessed by the server device 1410.

A communication processing unit 1411 executes the communication process with the terminal device 1400. To be specific, the acquisition request for the information is received, and, if the information matching with the content thereof is retained in the storage 1415, this information is sent back as the response.

A response generating unit 1412 generates the response that is transmitted to the terminal device. The information needed for the generation is acquired from the storage 1415 or a sleep time calculation unit 1413.

The sleep time calculation unit 1413 calculates the sleep time during which the terminal device 1400 transmitting the request would be able to sleep and notify the calculated time to the response generating unit 1412. The method of calculating the sleep time will be described later on.

A communication information retaining unit 1414 retains various items of communication information needed for calculating the sleep time. The communication information is exemplified by the RTT, the throughput, etc. calculated from the communications performed with the terminal device 1400 in the past. However, as described in the first embodiment, the items of information retained in the communication information retaining unit are aggregated on the network-by-network basis, and average values thereof may also be recorded. The server device 1410 calculates the throughput based on the size of the requested information and the time expended for the transmission to the terminal device.

Note that, in the present embodiment, the server device 1410 has the server function (Web server etc.) of accumulating a large quantity of information in the storage 1415 and reading and returning the requested information from the terminal device, and yet it is feasible to realize a separate server including the communication processing unit, the sleep time calculation unit, the response generating unit and the communication information retaining unit and also being independent of the Web server etc. In this case, this separate server temporarily accepts the acquisition request from the terminal device, acquires the information related to the acquisition request from the server device such as the Web server, then accumulates the information in the internal information retaining unit, and returns the information to the terminal device. The separate server calculates the sleep time in a way that takes account of respective communication characteristics between the server device and the terminal device.

Sixth Embodiment

Operation Sequence

The operation of the terminal device 1400 is substantially the same as in the fifth embodiment. However, the terminal device 1400 does not calculate the sleep time. In the sixth embodiment, the sleep time is contained in the response given from the server device 1410. The arithmetic unit 1401 grasps the sleep time by directly interpreting the received response and performs the control to get the operation transitioning to the sleep status. Alternatively, the arithmetic unit 1401 obtains the sleep time extracted by the request processing unit 1409 from the response via the register and performs the control to get the operation transitioning to the sleep status. Portions other than this are the same as those in the fifth embodiment.

Figure 15:
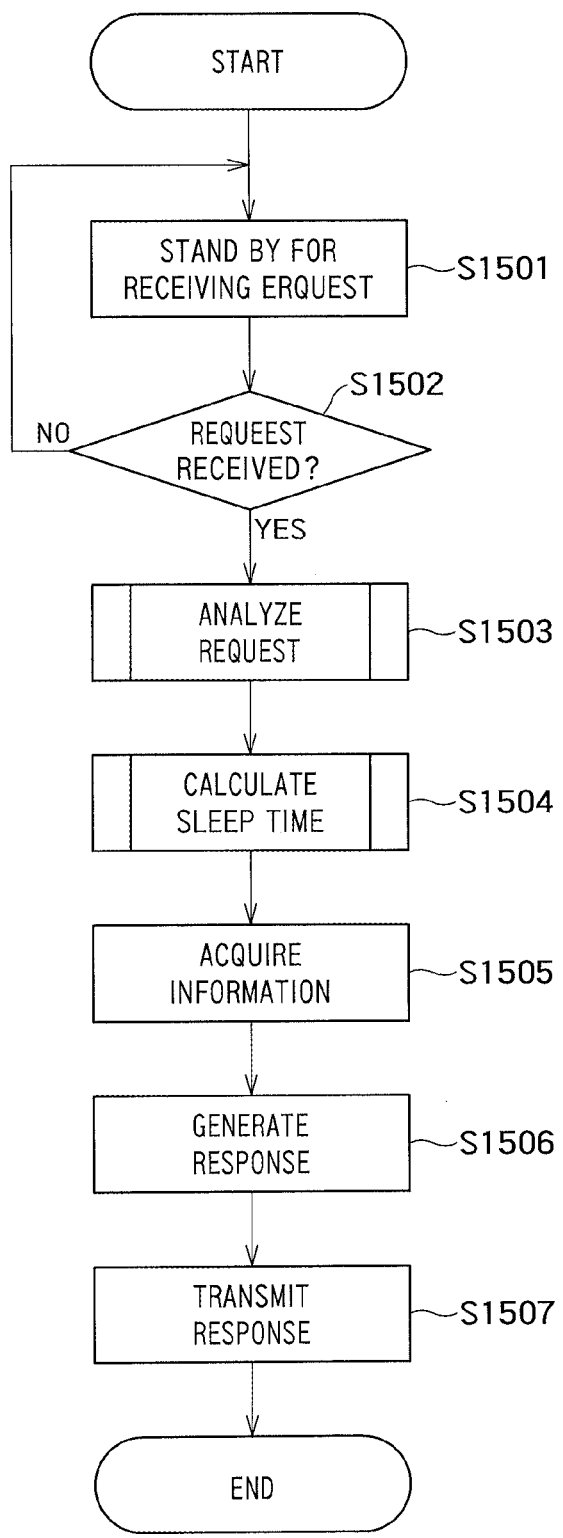
FIG. 15 is a diagram showing an operation sequence of the server device.

Subsequently, the operation of the server device 1410 will be stated. FIG. 15 shows an operation sequence thereof. The server device 1410 stands by till receiving the acquisition request from the terminal device 1400 (S1501). When receiving the acquisition request (S1502—YES), the communication processing unit 1411 analyzes the request (S1503) and requests the response generating unit 1412 to generate the proper response. The sleep time calculation unit 1413 calculates the sleep time (S1504), and the response generating unit 1412 receives the sleep time from the sleep time calculation unit 1413 and extracts the requested information from the storage 1415 (S1505). Then, the response generating unit 1412 generates the response and sends the response back to the communication processing unit 1411. The communication processing unit 1411 returns the generated response to the terminal device 1400. For example, the communication processing unit 1411 returns the response containing the sleep time and the response containing the information to the terminal device 1400. In the terminal device 1400, e.g., the arithmetic unit 1401 transitions to the sleep status only for the sleep time, and meanwhile the network interface 1403 receives the response containing the information given from the server device 1410 and accumulates the information in the information retaining unit 1406.

FIG. 16 shows an example of the information retained in the communication processing unit 1411. A row S1601 is a row (entry) in the case of the HTML file being requested and indicates that a total size of 300 KB. The total size "300 KB" represents the total size of the information that is statically referred to from the HTML file. The information does not contain, for instance, information of the file referred to by executing a script described in a JavaScript file referred to from the HTML file. This is because the requirement or non-requirement of the file is unknown till the timing of executing the script. On the other hand, a row S1602 is an instance for the script that is dynamically executed by the server side. The total size "756 KB" is a total size of the information that is invariably referred to from the script. Similarly to the case of the HTML file, this size does contain the file of which the requirement or non-requirement is unknown till executed on the side of the terminal device 1400.

Figure 17:
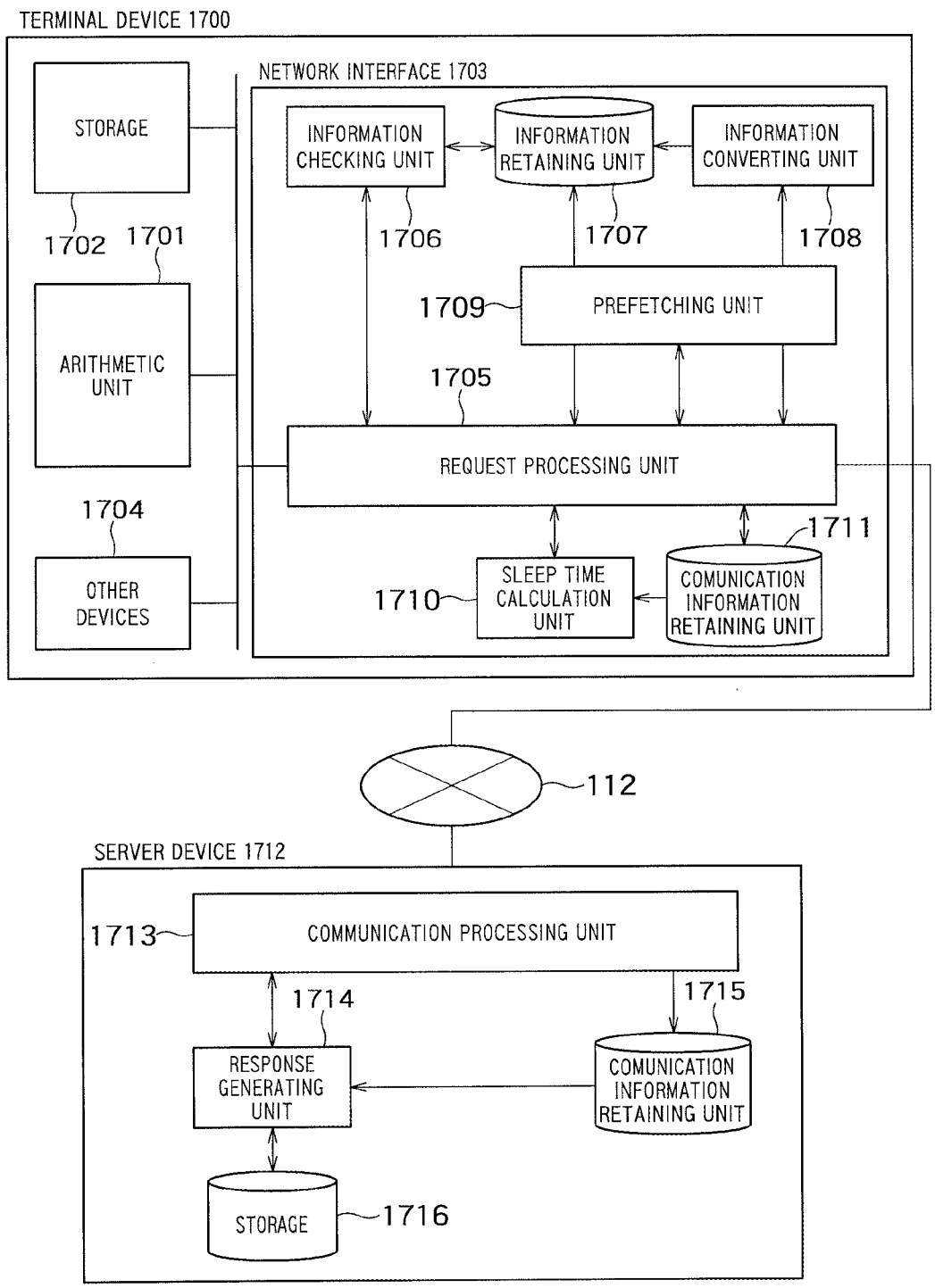
FIG. 17 is a functional block diagram of the terminal device and the server device in a modified example of the sixth embodiment.

FIG. 17 illustrates a terminal device 1700 and a server device 1712 according to a modified example of the sixth embodiment. Note that illustration for components not related to directly to (the modified example of) the sixth embodiment are omitted in the server device 1712. Unlike FIG. 14, a sleep time calculation unit 1710 is provided not in the server device 1712 but in a network interface 1703 of the terminal device 1700. Further, the communication information retaining units are provided not only in the server device 1712 but also in the network interface 1703 of the terminal device 1700. In this modified example, the sleep time is calculated not by the server device 1712 but by the terminal device 1700, and this point is largely different the configuration in FIG. 14. Only the changed portions will hereinafter be described.

A response generating unit 1714 generates the sleep response by use of the information stored in a communication information retaining unit 1715. For example, the size of the information requested for the acquisition is acquired from the communication information retaining unit 1715 and contained in the sleep response. A communication information retaining unit 1711 of the terminal device 1700 retains the information needed for calculating the sleep time. For instance, a table retaining an association between the size and the sleep time may be used, and communication characteristic information calculated form the communications performed in the past may also be used. The sleep time calculation unit 1710 calculates the sleep time on the basis of the information stored in the communication information retaining unit 1711 and the size information contained in the sleep response. A request processing unit 1705 notifies, to an arithmetic unit 1701, the sleep time via the register or by exchanging the messages on the internal bus.

Seventh Embodiment

Specific Hardware Configurations in First to Sixth Embodiments

Figure 18:
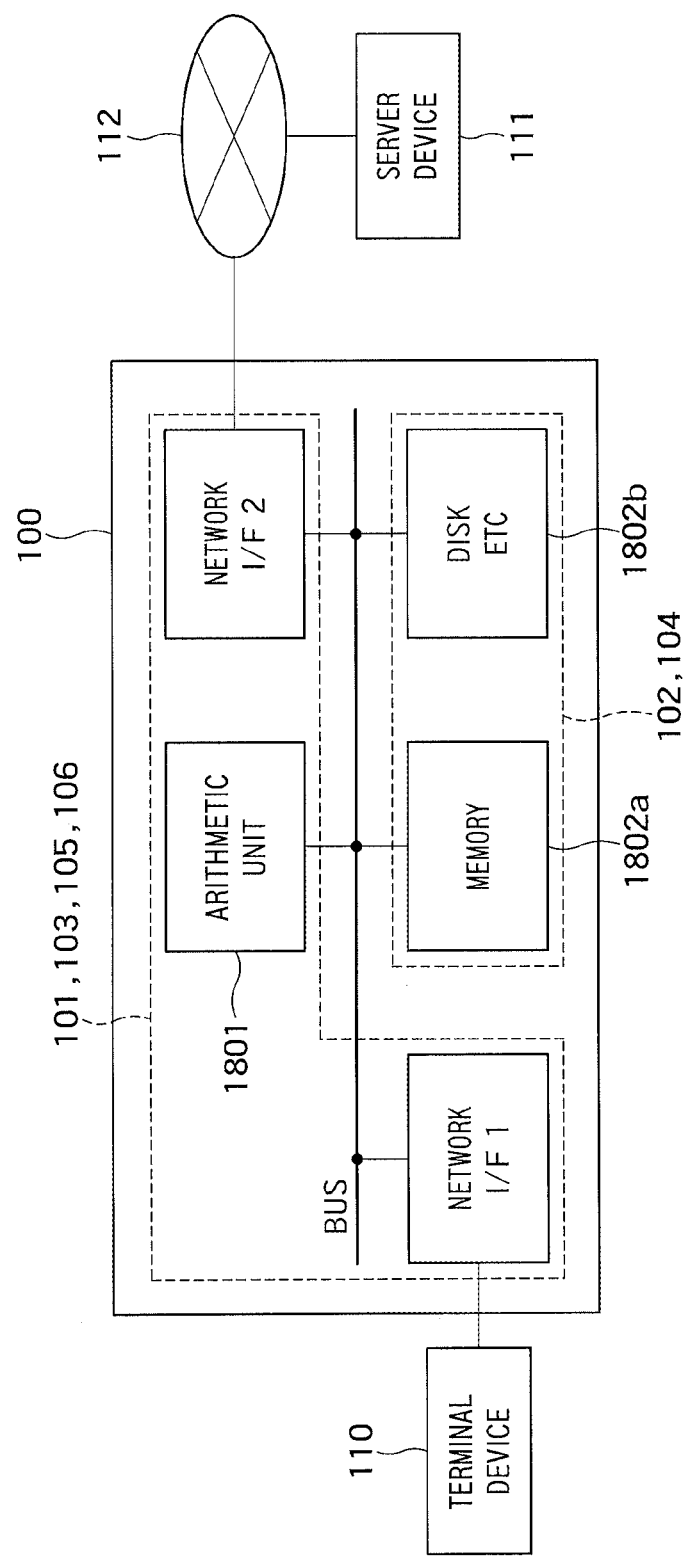
FIG. 18 is a diagram illustrating a hardware configuration of the communication device in the first embodiment.

FIG. 18 illustrates an example of a hardware configuration of the communication device in the first embodiment.

The information checking unit 103, the request processing unit 101, the response generating unit 105 and the sleep time calculation unit 106 in FIG. 1 are aggregated into an arithmetic unit 1801 and are expressed as, e.g., software on the CPU. The information retaining unit 102 and the communication information retaining unit 104 are actualized as storages such as a memory 1802a and a disk 1802b. A network I/F1 is a network interface on the side of the terminal device 110, and a network I/F2 is a network interface on the side of the server device 111.

Figure 19:
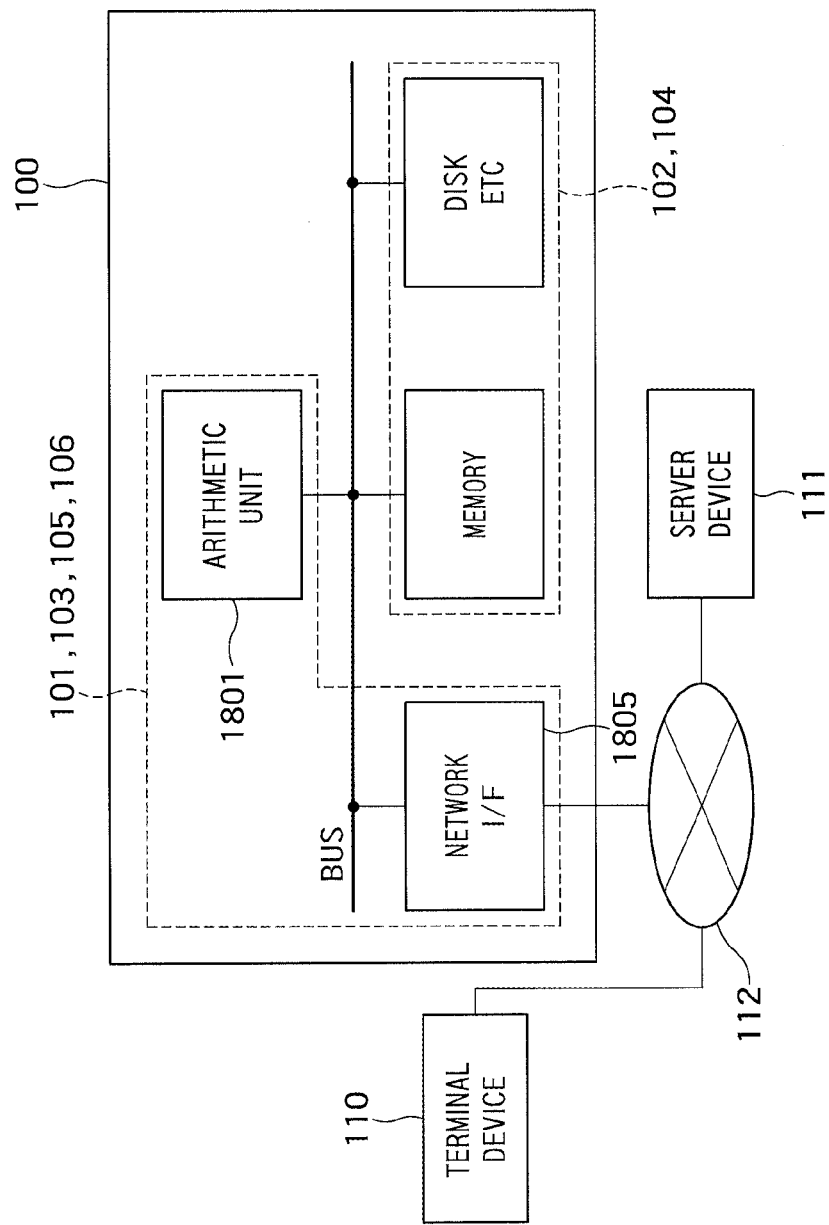
FIG. 19 is a diagram illustrating a modified example of the configuration in FIG. 18.

FIG. 19 illustrates a modified example of the configuration in FIG. 18. The network I/F1 and the network I/F2 are aggregated into one single network I/F1805. The terminal device 100 and the server device 111 have a topology in the case of being connected to the same network.

Figure 20:
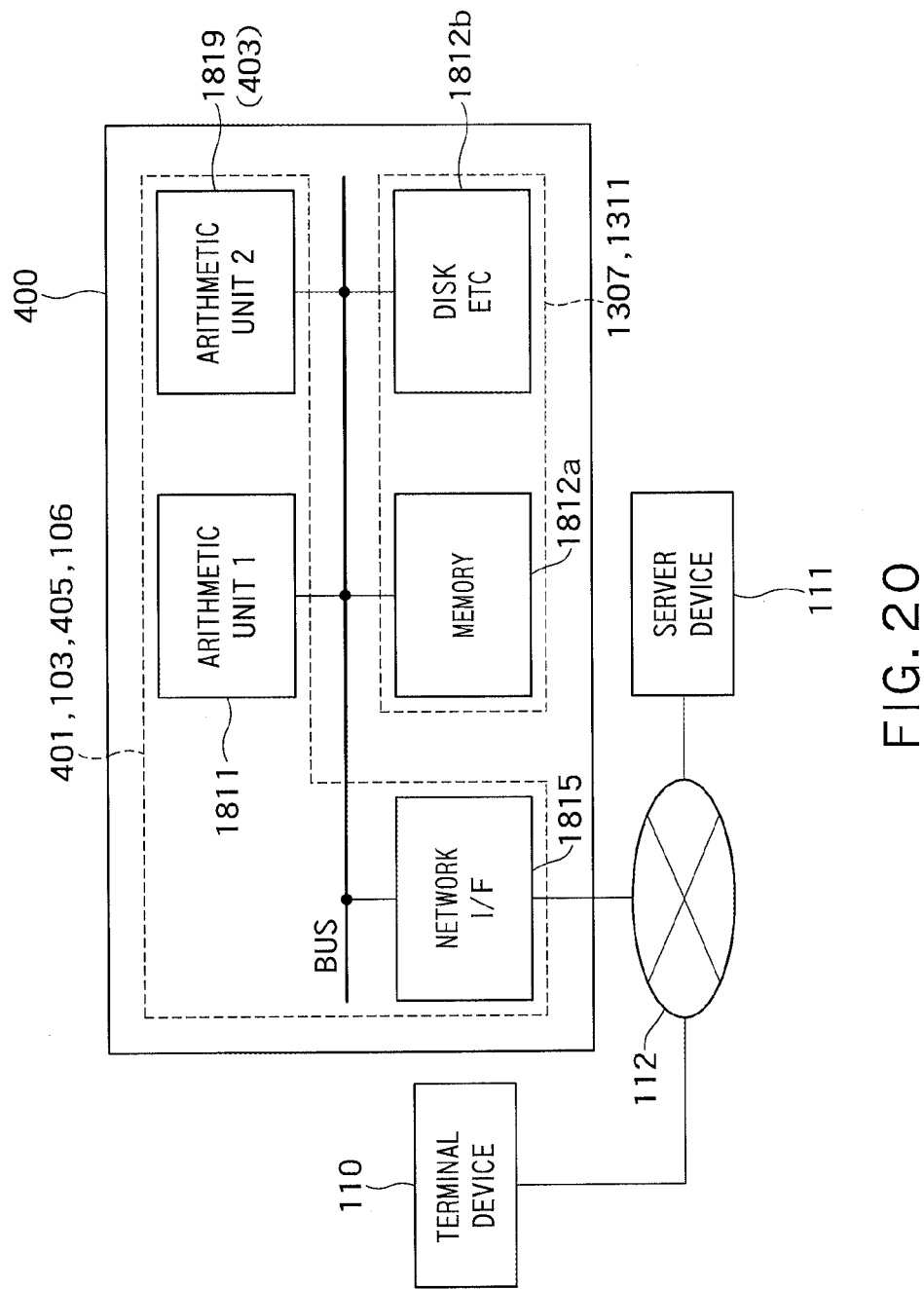
FIG. 20 is a diagram illustrating a hardware configuration of the communication device in the second embodiment.

FIG. 20 shows an example of the hardware configuration of the communication device in the second embodiment.

The information checking unit 103, the request processing unit 401, the response generating unit 405 and the sleep time calculation unit 106 are aggregated into an arithmetic unit 1811 and are expressed as, e.g., the software on the CPU. The information converting unit 403 is configured as an arithmetic unit 1819 defined as a sole dedicated circuit. As in FIG. 18, the information converting unit 403 may also be configured in aggregation into the arithmetic unit 1811. The information retaining unit 402 and the communication information retaining unit 104 are actualized as storages such as a memory 1812a and a disk 1812b. A network I/F1815 is a network interface with the network to which the terminal device 110 and the server device 111 are connected.

The communication devices (FIGS. 8 and 11) in the third and fourth embodiments can be configured similarly to FIGS.

18-20. The prefetching unit 1801 may be aggregated into the arithmetic unit 1801 or the arithmetic unit 1811 and may also be configured as a sole arithmetic circuit like an arithmetic unit 1819.

Figure 21:
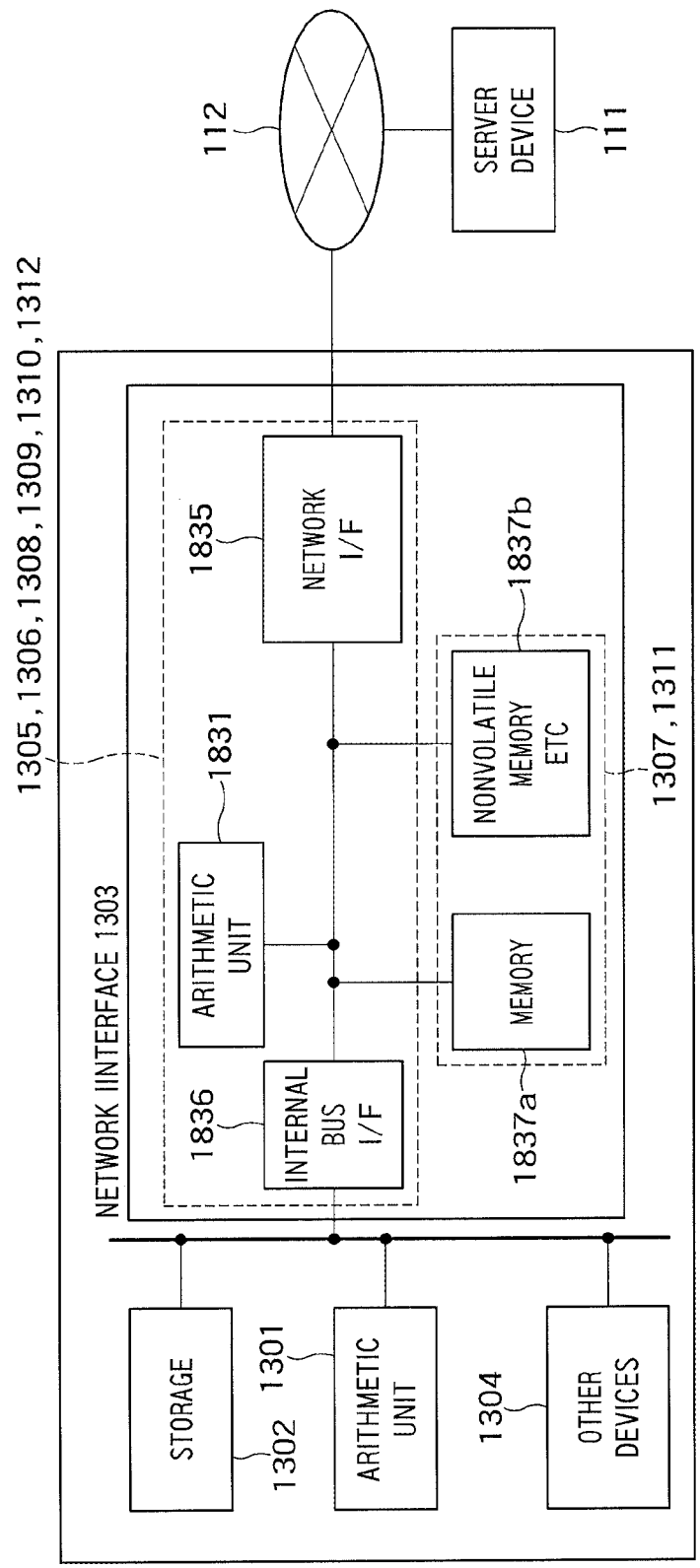
FIG. 21 is a diagram illustrating a hardware configuration of the communication device in the fifth embodiment.

FIG. 21 shows an example of the hardware configuration of the terminal device in the fifth embodiment.

A configuration of the network interface 1303 illustrated in FIG. 13 can be arranged into the same physical configuration as in FIG. 1. The request processing unit 1305, the information checks unit 1306, the information converting unit 1308, the response generating unit 1309, the sleep time calculation unit 1310 and the prefetching unit 1312 are aggregated into the arithmetic unit 1831 and are expressed as, e.g., the software on the CPU. The network I/F 1835 is connected to the network 112 on the side of the server device 111, and the internal bus I/F 1836 is connected to the internal bus. The information retaining unit 1307 and the communication information retaining unit 1311 are expressed as storages such as a memory 1837a and a nonvolatile memory 1837b.

Figure 22:
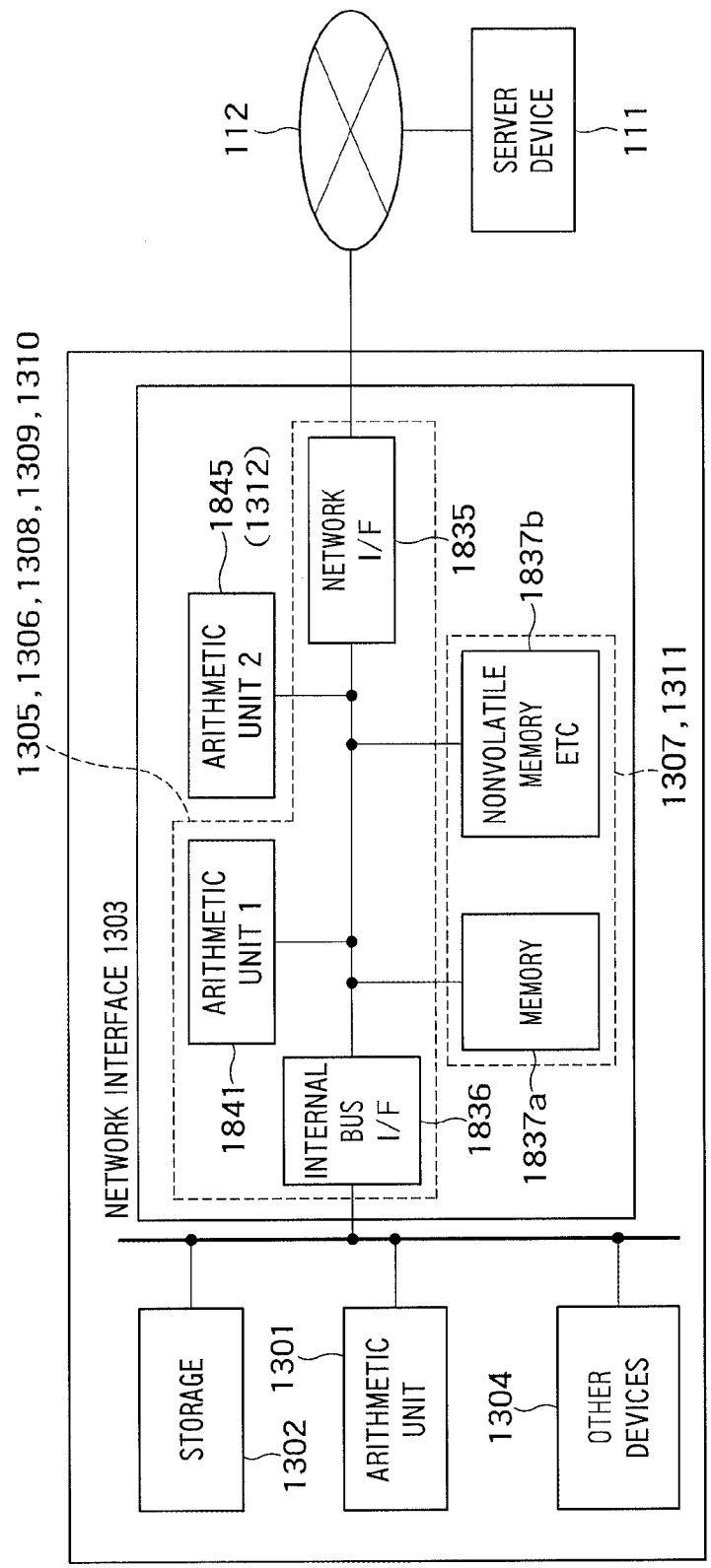
FIG. 22 is a diagram illustrating a modified example of the configuration in FIG. 21.

FIG. 22 illustrates a modified example of the configuration in FIG. 21. The example shown herein is that the function of the prefetching unit 1312 is separated from the arithmetic unit 1831 and is configured as a sole circuit (arithmetic unit) 1845. The components other than the prefetching unit 1312 shall be configured as an arithmetic unit 1841. Thus, the function in the network interface 1303 can be also implemented as a plurality of arithmetic units.

Figure 23:
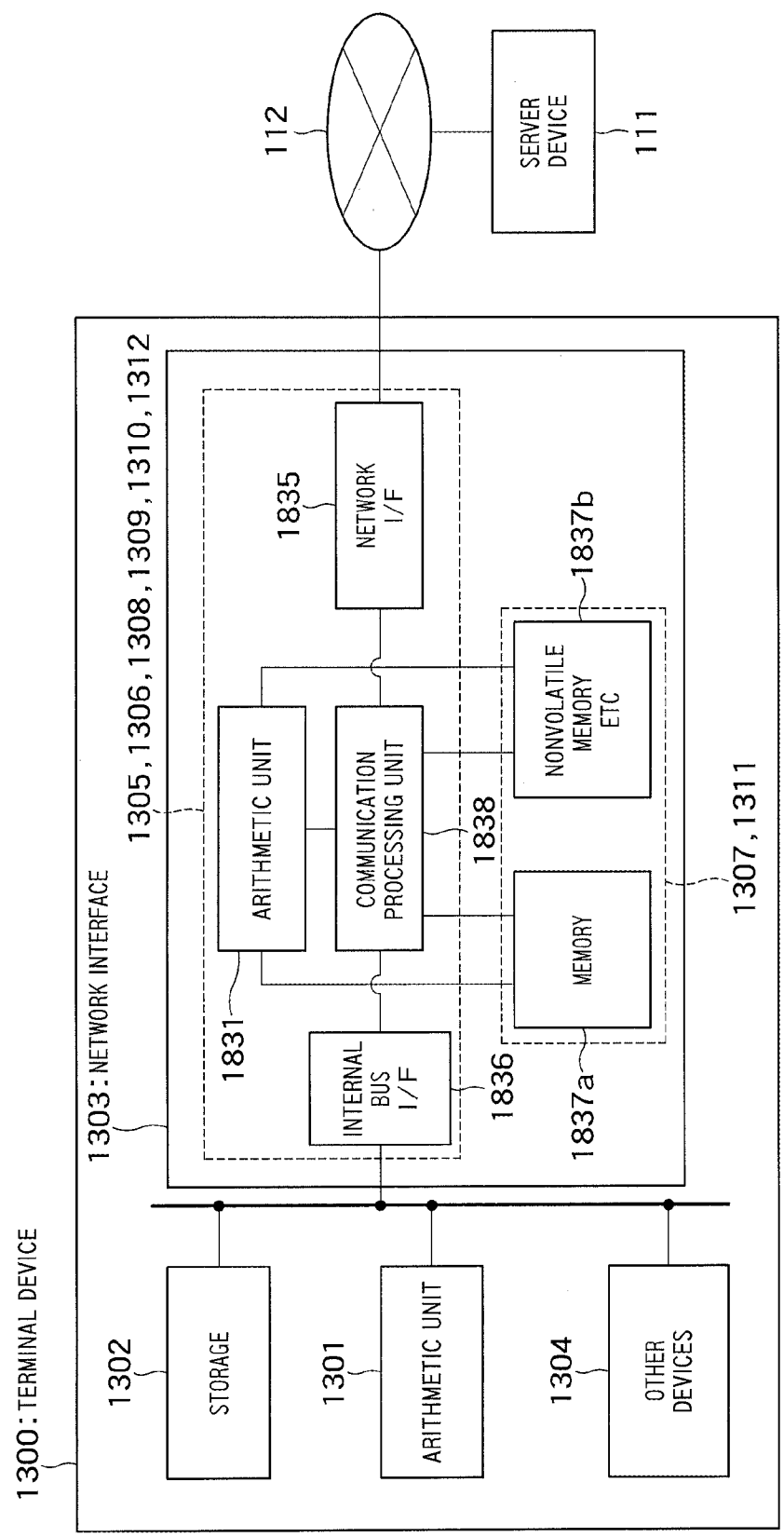
FIG. 23 is a diagram illustrating another modified example of the configuration in FIG. 21.

FIG. 23 depicts another modified example of the configuration in FIG. 21. A communication processing unit 1838 is disposed as a sole circuit by separating the communications processing function (the communication processing function incorporated into the request processing unit 1305 in FIG. 13) incorporated into the arithmetic unit 1831 in FIG. 21. The communication processing unit 1838 in place of the CPU etc. executes a part or the whole of the communication process (TCP/IP etc.) performed so far by the arithmetic unit 1831 such as the CPU, thereby reducing the load on the CPU etc. and enabling the CPU etc. to concentrate on other processes.

Eighth Embodiment

Figure 24:
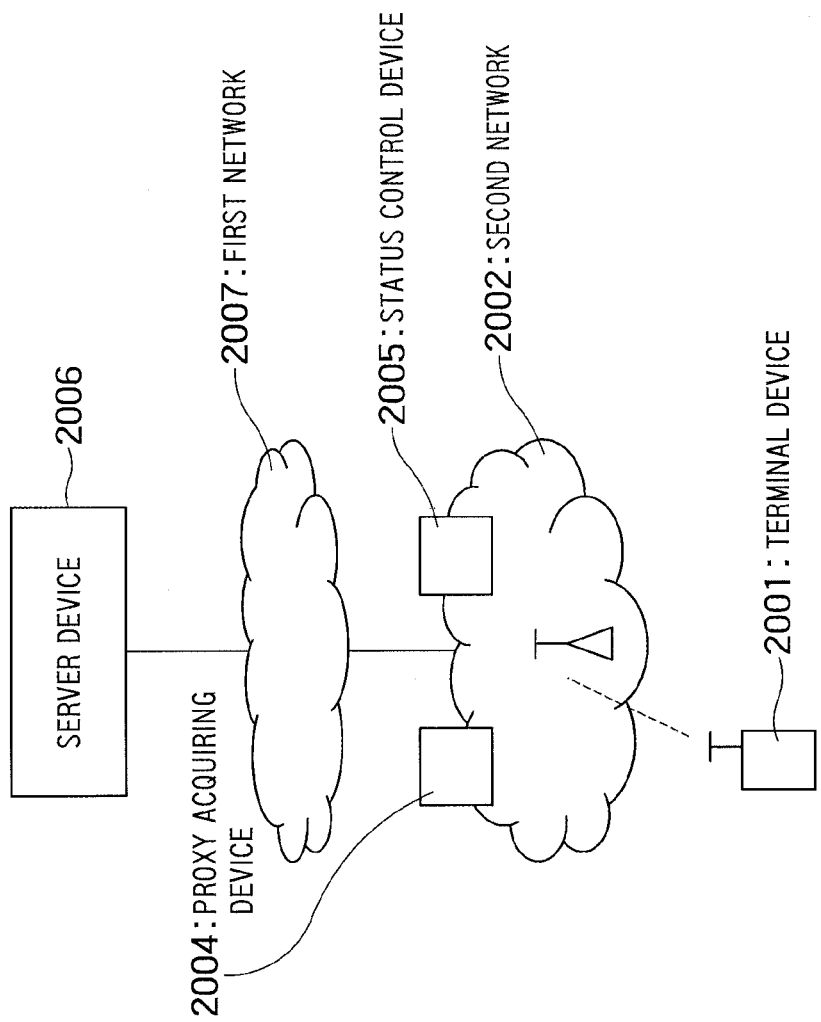
FIG. 24 is a diagram illustrating a system according to an eighth embodiment.

FIG. 24 illustrates a system according to an eighth embodiment of the present invention. A proxy acquiring device 2004 and a status control device 2005 are connected to a first network 2007 which is a wired network constituting a backbone such as the Internet, and can communicate with a server device 2006 on the first network 2007. The proxy acquiring device 2004 and the status control device 2005 are also connected to a second network 2002 and can communicate with a terminal device 2001 via a base station on the second network 2002. The proxy acquiring device 2004 may be connected directly to the network 2007 or may also be connected to the first network 2007 via a gateway disposed to establish a connection between the second network 2002 and the first network 2007. The proxy acquiring device 2004 and the status control device 2005 may be connected to the terminal device 2001 via the base station or may also be wireless-connected directly to the terminal device 2001. The proxy acquiring device 2004 is a device which receives an acquisition request from the terminal device 2001 and acquires necessary information from the server device 2006 on the first network 2007. The server device 2006 is the same as the server device described in the first embodiment. The status control device 2005 is capable of performing the communications with the proxy acquiring device 2004 via the first network 2007 or the second network 2002. The status control device 2005 is a device that controls the status of the terminal device and transmits, as one example, an instruction of transitioning to the sleep status to the terminal device 2001.

Figure 25:
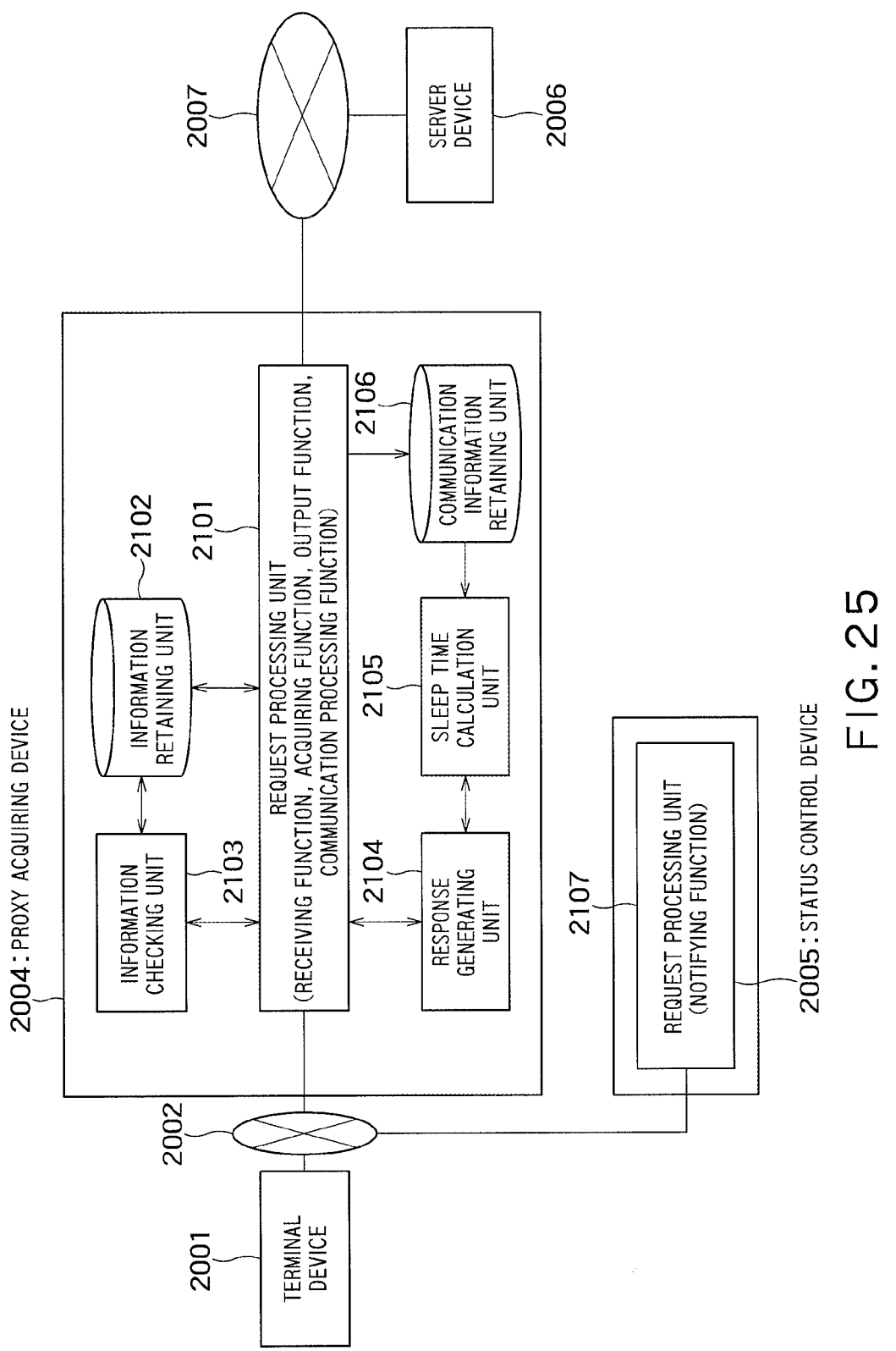
FIG. 25 is a diagram illustrating an example of configurations of a proxy acquiring device and a status control device.

FIG. 25 depicts configurations of the proxy acquiring device 2004 and the status control device 2005.

The proxy acquiring device 2004 includes a request processing unit 2101, an information retaining unit 2102, an information checking unit 2103, a response generating unit 2104, a sleep time calculation unit 2105 and a communication information retaining unit 2106. The status control device 2005 includes a request processing unit 2107. In the eighth embodiment, the information retaining unit 2102, the information checking unit 2103, the response generating unit 2104, the sleep time calculation unit 2105 and the communication information retaining unit 2106 are the same as those in the first embodiment, but the function of the request processing unit 2101 is partly different.

The request processing unit 2101 incorporates, similarly to the request processing unit 101 (see FIG. 1) described in the first embodiment, the functions such as the function of receiving the acquisition request for requesting the acquisition of the information from the terminal device, the function of determining whether the requested information needs to be acquired from the server device or not, the function of acquiring, if necessary for the acquisition, the requested information, the output function of transmitting the acquired information to the terminal device and the communication processing function of performing the network process necessary for acquiring the information but does not incorporate the function of sending the sleep response generated by the response generating unit 2104 back to the terminal device. In the first embodiment, the request processing unit receiving the sleep response from the response generating unit transmits the sleep response to the terminal device. However, in the eighth embodiment, the request processing unit 2101 notifies not the terminal device 2001 but the status control device 2005 of the sleep response generated by the response generating unit 2104 together with an identifier of the terminal device 2001 via the second network 2002.

The request processing unit 2107 of the status control device 2005 receives the sleep response transmitted from the proxy acquiring device 2004 and the identifier of the target terminal device. The request processing unit 2107 of the status control device 2005, upon receiving the sleep response notified from the proxy acquiring device 2004 and the identifier of the target terminal device, transmits the sleep response to the terminal device specified by the identifier via the second network 2002. That is, in the functions of the request processing unit described in the first embodiment, the notifying function of transmitting the sleep response to the terminal device is incorporated into the status control device 2005 different from the proxy acquiring device 2004 in the eighth embodiment.

Note that the status control device 2005 may include a storage for managing the identifier of the terminal device and another identifier managed by the device 2005 itself in the way of their being associated with each other. Further, the status control device 2005 may include a storage for retaining and managing the status of the terminal device per identifier of the terminal device. Still further, the status control device 2005 may incorporate a function of converting the sleep response into a format interpretable by the terminal device. The converting function corresponds to, by way of one example, a function of converting the sleep response notified as a HTTP-based response message from the proxy acquiring device 2004 into a control signal used in a cellular network and a control signal used in a wireless LAN.

As discussed above, the functions of the request processing unit described in the first embodiment can be realized by separating the functions into the plurality of devices as well as in the case of being realized within the single device. Namely, the device for controlling the status of the terminal device (requester) can be realized by disposing the sleep response notifying function, as a single device, in the functions incorporated into the request processing device described in the first embodiment.

The communication device as described in each embodiment may also be realized using a general-purpose computer device as basic hardware. That is, each unit in the device can be realized by causing a processor mounted in the above described computer device to execute a program. In this case, the communication device may be realized by installing the above described program in the computer device beforehand or may be realized by storing the program in a storage medium such as a CD-ROM or distributing the above described program over a network and installing this program in the computer device as appropriate. Furthermore, the storages in the communication device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A processing device comprising a computer including circuitry, the computer being configured to control the processing device to perform operations comprising:
   receiving an acquisition request of first information from a requester, checking whether a predetermined condition is satisfied based on the acquisition request, and determining whether or not the first information needs to be acquired from an acquisition destination of the first information, the acquisition destination being a device connected with the processing device via a network; and
   transmitting a first response to the requester when determining that the first information needs to be acquired, the first response containing an instruction which causes the requester to transition to a low power consumption status,
   wherein the requester is one or the other of (i) a device connected via a network, the acquisition request being received via the network, and the first response being transmitted via the network and (ii) a device connected via an internal bus, and the first response being transmitted through a register or through exchanging messages on the internal bus, to the requester.

2. The processing device according to claim 1, wherein the computer is configured to control the processing device to perform further operations comprising checking whether the first information has previously been acquired or not and, when not previously acquired, determining that the first information needs to be acquired.

3. The processing device according to claim 2, wherein the computer is configured to control the processing device to perform further operations comprising determining, when the previously-acquired first information expires after a period of validity or when a fixed period of time elapses since the first information has been acquired, that the first information needs to be acquired.

4. The processing device according claim 1, wherein the computer is configured to control the processing device to perform further operations comprising determining, when the first information has previously been acquired, that the first information does not need to be acquired, and
   transmitting a second response containing the previously-acquired first information to the requester.

5. The processing device according to claim 1, wherein the computer is configured to control the processing device to perform further operations comprising acquiring, when the first information has not previously been acquired, the first information from the acquisition destination, and
   transmitting a second response to the requester, the second response containing the acquired first information.

6. The processing device according to claim 1, wherein the computer is configured to control the processing device to perform further operations comprising converting the first information into a format compatible with the requester,
   transmitting, to the requester, the first response containing an instruction of transmitting an acquisition request of information into which the first information is converted, and
   when receiving a first acquisition request from the requester, outputting a second response containing the information into which the first information is converted by the converting unit to the requester.

7. The processing device according to claim 1, wherein the computer is configured to control the processing device to perform further operations comprising transmitting, to the requester, the first response that contains information for specifying time during which the requester transitions to the low power consumption status.

8. The processing device according to claim 7, wherein the computer is configured to control the processing device to perform further operations comprising calculating the information for specifying the time during which the requester transitions to the low power consumption status on the basis of time information required for acquiring the first information.

9. The processing device according to claim 8, wherein the computer is configured to control the processing device to perform further operations comprising calculating the time information required for acquiring the first information on the basis of at least one of a characteristic of communications with the acquisition destination of the first information and size information of the first information.

10. The processing device according to claim 1, wherein the computer is configured to control the processing device to perform further operations comprising analyzing the first information and acquiring second information that is referred to from the first information from an acquisition destination of the second information; and
    calculating the information for specifying the time during which the requester transitions to the low power consumption status on the basis of time information required for acquiring the second information or size information of the second information,
    transmitting, to the requester, the first response containing the calculated specifying information.

11. The processing device according to claim 10, wherein the computer is configured to control the processing device to perform further operations comprising calculating the time information required for acquiring the second information on the basis of at least one of the characteristic of the communications with the acquisition destination of the second information, the size information of the second information and the number of pieces of the second information.

12. The processing device according to claim 1, wherein the computer is configured to control the processing device to perform further operations comprising analyzing the first information and acquiring the second information that is referred to from the first information from an acquisition destination of the second information; and calculating information for specifying time during which the requester transitions to the low power consumption status on the basis of a residual quantity of a storage configured to store the first information and the second information, a residual quantity of a buffer related to the communication process, or a predetermined period of upper limit time, transmitting, to the requester, the first response containing the specifying information.

13. A terminal device comprising:

a network interface comprising a computer including circuitry, the computer being configured to control the network interface to perform operations including receiving an acquisition request of first information from a requester and determining based on a predetermined condition whether or not the first information needs to be acquired from an acquisition destination of the first information connected via a network; and transmitting, when determining that the first information needs to be acquired, to the requester, a first response containing an instruction which causes the requester to transition to a low power consumption status, wherein the requester is one or the other of (i) a device connected via a network, the acquisition request being received via the network, and the first response being transmitted via the network and (ii) a device connected via an internal bus, and the first response being transmitted through a register or through exchanging messages on the internal bus, to the requester;

a hardware storage configured to store a program; and an arithmetic circuit configured to connect with the network interface unit and the hardware storage via an internal bus and to control the network interface unit by reading the program from the hardware storage and executing the program.

14. The terminal device according to claim 13, wherein the requester is the arithmetic circuit.

15. A processing method, comprising:

receiving an acquisition request of first information from a requester and determining based on a predetermined condition whether or not the first information needs to be acquired from an acquisition destination of the first information, the acquisition destination being a device connected via a network; and transmitting a first response to the requester when the first information needs to be acquired, the first response containing an instruction for transitioning the requester to a low power consumption status, wherein the requester is one or the other of (i) a device connected via a network, the acquisition request being received via the network, and the first response being transmitted via the network and (ii) a device connected via an internal bus, and the first response being transmitted through a register or through exchanging messages on the internal bus, to the requester.

\* \* \* \* \*